US 12,543,086 B2

(12) United States Patent
Teyeb et al.

(10) Patent No.: US 12,543,086 B2
(45) Date of Patent: Feb. 3, 2026

(54) INTER-CU MIGRATION IN IAB NETWORK

(71) Applicant: Telefonaktiebolaget LM Ericsson (publ), Stockholm (SE)

(72) Inventors: Oumer Teyeb, Montréal (CA); Ajmal Muhammad, Sollentuna (SE); Filip Barac, Huddinge (SE); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 18/017,712

(22) PCT Filed: Jul. 15, 2021

(86) PCT No.: PCT/SE2021/050729
§ 371 (c)(1),
(2) Date: Jan. 24, 2023

(87) PCT Pub. No.: WO2022/015230
PCT Pub. Date: Jan. 20, 2022

(65) Prior Publication Data
US 2023/0269644 A1   Aug. 24, 2023

Related U.S. Application Data

(60) Provisional application No. 63/059,428, filed on Jul. 31, 2020, provisional application No. 63/053,522, filed on Jul. 17, 2020.

(51) Int. Cl.
*H04W 36/12* (2009.01)
*H04W 40/22* (2009.01)
(52) U.S. Cl.
CPC ........... *H04W 36/12* (2013.01); *H04W 40/22* (2013.01)

(58) Field of Classification Search
CPC ............... H04W 56/005; H04W 56/00; H04W 72/1268; H04W 74/0833; H04W 74/0841;
(Continued)

(56) References Cited

U.S. PATENT DOCUMENTS 11,622,300 B2 * 4/2023 Byun ................ H04W 36/0033
370/331
11,706,690 B2 * 7/2023 Akl ....................... H04W 36/38
370/331

(Continued)

FOREIGN PATENT DOCUMENTS

CN     107371208 A    11/2017
WO   2018211170 A1   11/2018
(Continued)

OTHER PUBLICATIONS

3GPP, "3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, 1-130.
(Continued)

*Primary Examiner* — Nathan S Taylor
(74) *Attorney, Agent, or Firm* — Murphy, Bilak & Homiller, PLLC

(57) ABSTRACT

A source Integrated Access Backhaul, IAB, node (20) sends a handover request (110) from the source IAB node (20) to a target IAB node (30) to which a Mobile Termination, MT, (10) of an IAB node is to be migrated. The handover request (110) comprises an indication of a proxied inter donor IAB node migration of the MT (10) to the target IAB node (30). In some embodiments, according to the indication of the proxied inter donor IAB node migration, a radio resource control, RRC, connection of the IAB node is to be migrated to the target IAB node (30) but F1 connections and RRC connections of any children nodes served by the IAB node
(Continued)

are to be kept at the source IAB node (20). In any event, the target IAB node (30) correspondingly receives the handover request (110) and sends a handover response (115) to the source IAB node (20).

26 Claims, 15 Drawing Sheets

(58) Field of Classification Search
CPC .. H04W 74/0866; H04W 74/08; H04W 72/12; H04W 60/00; H04W 76/18; H04W 68/005; H04W 8/24; H04W 84/042; H04W 92/24; H04W 68/00; H04W 36/10; H04W 36/12; H04W 40/22; H04W 84/12; G01S 13/003; G01S 13/765; G01S 13/767; G01S 13/87; G01S 13/00; G01S 13/76; G01S 5/02; H04L 43/0864
USPC ........................................................ 370/331
See application file for complete search history.

(56) References Cited

U.S. PATENT DOCUMENTS

| | | | |
|---|---|---|---|
| 2017/0006499 | A1 | 1/2017 | Hampel et al. |
| 2021/0044958 | A1* | 2/2021 | Abedini ............... H04W 8/08 |
| 2021/0227435 | A1* | 7/2021 | Hsieh ............... H04W 36/087 |
| 2021/0297909 | A1 | 9/2021 | Lee et al. |
| 2021/0377980 | A1* | 12/2021 | Fujishiro ............ H04W 88/14 |
| 2022/0014976 | A1* | 1/2022 | Luo ................. H04W 36/0044 |
| 2022/0201777 | A1* | 6/2022 | Teyeb ................. H04W 76/11 |
| 2022/0264383 | A1* | 8/2022 | Teyeb ............. H04W 36/0061 |
| 2022/0361072 | A1 | 11/2022 | Zhu et al. |
| 2023/0130178 | A1* | 4/2023 | Zhuo ................. H04W 36/0064 370/329 |
| 2023/0189096 | A1* | 6/2023 | Barac ............. H04W 36/00837 370/331 |
| 2023/0232285 | A1* | 7/2023 | Barac ............... H04W 36/0088 370/331 |
| 2023/0239755 | A1* | 7/2023 | Teyeb ................. H04W 40/24 370/331 |
| 2023/0247495 | A1* | 8/2023 | Teyeb ................. H04W 40/24 370/331 |
| 2023/0269634 | A1* | 8/2023 | Teyeb ................. H04W 92/20 370/331 |
| 2023/0284312 | A1* | 9/2023 | Parichehrehteroujeni ........... H04W 76/27 370/216 |

FOREIGN PATENT DOCUMENTS

| | | | |
|---|---|---|---|
| WO | 2019246446 | A1 | 12/2019 |
| WO | 2021140032 | A1 | 7/2021 |

OTHER PUBLICATIONS

3GPP, "3GPP TS 38.413 V16.1.0", 3rd Generation Partnership Project; Technical Specification Group Radio Access Network; NG-RAN; NG Application Protocol (NGAP) (Release 16), Mar. 2020, 1-26.

3GPP, "3rd Generation Partnership Project; Technical Specification Group Radio Access Network; NR; Radio Link Control (RLC) protocol specification (Release 16)", 3GPP TS 38.322 V16.1.0, Jul. 2020, 36 pages.

"IAB topology adaptation for architecture 1a", 3GPP TSG-RAN WG3 Meeting #101; R3-184693; Gothenburg, Sweden, Aug. 20-24, 2018, 1-13.

3GPP, "3GPP TS 38.300 V16.2.0", 3rd Generation Partnership Project; Technical Specification Group Radio Access Network; NR; NR and NG-RAN Overall Description; Stage 2 (Release 16), Jul. 2020, 1-148.

3GPP, "3GPP TS 38.322 V16.0.0", 3rd Generation Partnership Project; Technical Specification Group Radio Access Network; NR; Radio Link Control (RLC) protocol specification (Release 16), Mar. 2020, 1-33.

3GPP, "3GPP TS 38.401 V15.8.0", 3rd Generation Partnership Project; Technical Specification Group Radio Access Network; NG-RAN; Architecture description (Release 15), Jul. 2020, 1-47.

3GPP, "3rd Generation Partnership Project; Technical Specification Group Radio Access Network; Evolved Universal Terrestrial Radio Access Network (E-UTRAN); X2 application protocol (X2AP) (Release 16)", 3GPP TS 36.423 V16.1.0, Mar. 2020, 1-438.

3GPP, "3rd Generation Partnership Project; Technical Specification Group Radio Access Network; NG-RAN; Architecture description (Release 16)", 3GPP TS 38.401 V16.1.0, Mar. 2020, 1-50.

3GPP, "3rd Generation Partnership Project; Technical Specification Group Radio Access Network; NG-RAN; F1 application protocol (F1AP) (Release 16)", 3GPP TS 38.473 V16.1.0, Mar. 2020, 1-240.

3GPP, "3rd Generation Partnership Project; Technical Specification Group Radio Access Network; NG-RAN; Xn application protocol (XnAP) (Release 16)", 3GPP TS 38.423 V16.1.0, Mar. 2020, 1-334.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, 1-111.

3GPP, "R2-1913254, 3GPP TS 38.340", 3rd Generation Partnership Project; Technical Specification Group Radio Access Network; NR; Backhaul Adaptation Protocol (BAP) specification (Release 16), Oct. 2019, 1-20.

QUALCOMM, "CR to 38.300 on Integrated Access and Backhaul for NR", 3GPP TSG-RAN WG2 Meeting #108, R2-1916641, Reno, NV, USA, Nov. 18-22, 2019, 1-28.

Unknown, Author, "New WID: Integrated Access and Backhaul for NR", 3GPP TSG RAN Meeting #82 RP-182882, Sorrento, Italy, Dec. 10-13, 2018, 1-7.

* cited by examiner

INTER-CU MIGRATION IN IAB NETWORK

TECHNICAL FIELD

The present description generally relates to wireless communication systems and more specifically to inter-Centralized Unit (CU) migration in an Integrated Access Backhaul (IAB) network.

BACKGROUND

Integrated Access Backhaul (IAB) Networks

Third Generation Partnership Project (3GPP) is currently standardizing integrated access and wireless access backhaul (IAB) in New Radio (NR) in Release-16 (RP-182882).

The usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides the opportunity for self-backhauling, without limiting the spectrum to be used for the access links. On top of that, the inherent multi-beam and Multiple Input Multiple Output (MIMO) support in NR reduces cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit. The IAB nodes each also have a Mobile Termination (MT) part that they use to communicate with their respective parent nodes.

The specifications for IAB strive to reuse existing functions and interfaces defined in NR. In particular, MT, gNB-DU, gNB-CU, User Plane Function (UPF), Access and Mobility Management Function (AMF) and Session Management Function (SMF) as well as the corresponding interfaces NR Uu (between MT and gNB), F1, NG, X2 and N4 are used as the baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a high-level architectural view of an IAB network, i.e. a reference diagram for IAB in standalone mode, which contains one IAB-donor and multiple IAB-nodes. The IAB-donor is treated as a single logical node that comprises a set of functions such as gNB-DU, gNB-CU-CP (Control Plane), gNB-CU-UP (User Plane) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in FIGS. 2 and 3 respectively.

The chosen protocol stacks reuse the current CU-DU split specification in Release-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and Datagram Transport Layer Security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the User Equipment (UE) bearer data to the proper backhaul Radio Link Control (RLC) channel (and also between ingress and egress backhaul RLC channels in intermediate IAB nodes) to satisfy the end to end Quality of Service (QoS) requirements of bearers.

BAP Entities

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows one example of the functional view of the BAP sublayer. This functional view should not restrict implementation. The figure is based on the radio interface protocol architecture defined in TS 38.300. In the example of FIG. 4, the receiving part on the BAP entity delivers BAP Protocol Data Units (PDUs) to the transmitting part on the collocated BAP entity. Alternatively, the receiving part may deliver BAP Service Data Units (SDUs) to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

Services Provided to Upper Layers

The following services are provided by the BAP sublayer to upper layers: data transfer.

Services Expected from Lower Layers

A BAP sublayer expects the following services from lower layers per Radio Link Control (RLC) entity (for a detailed description see 3GPP TS 38.322): acknowledged data transfer service; unacknowledged data transfer service.

Functions

The BAP sublayer supports the following functions: Data transfer; Determination of BAP destination and path for packets from upper layers; Determination of egress BH RLC channels for packets routed to the next hop; Routing of packets to the next hop; Differentiating traffic to be delivered to upper layers from traffic to be delivered to egress link; Flow control feedback and polling signaling.

Topology Adaptation Scenarios for Baseline Architecture

FIG. 5 shows an example of some possible IAB-node migration cases, listed in the order of complexity as follows:

Intra-CU Case (A): In this case the IAB-node (E) along with its serving UEs is moved to a new parent node (IAB-node (B)) under the same donor-DU(1). The successful intra-donor DU migration requires establishing UE context setup for the IAB-node (E) MT in the DU of the new parent node (IAB-node (B)), updating routing tables of IAB nodes along the path to IAB-node (E) and allocating resources on the new path. The IP address for IAB-node (E) will not change, while the F1-U tunnel/connection between donor-CU(1) and IAB-node (E) DU will be redirected through IAB-node (B).

Intra-CU Case (B): The procedural requirements/complexity of this case is the same as that of Case (A). Also, since the new IAB-donor DU (i.e. DU2) is connected to the same L2 network, the IAB-node (E) can use the same IP address under the new donor DU. However, the new donor DU (i.e. DU2) will need to inform the network using IAB-node (E) L2 address in order to get/keep the same IP address for IAB-node (E) by employing some mechanism such as Address Resolution Protocol (ARP).

Intra-CU Case (C): This case is more complex than Case (A) as it also needs allocation of new IP address for IAB-node (E). In case, IPsec is used for securing the F1-U tunnel/connection between the Donor-CU(1) and IAB-node (E) DU, then it might be possible to use existing IP address along the path segment between the Donor-CU(1) and SeGW, and new IP address for the IPsec tunnel between SeGW and IAB-node (E) DU.

Inter-CU Case (D): This is the most complicated case in terms of procedural requirements and may needs new specification procedures that are beyond the scope of 3GPP Rel-16.

Note that 3GPP Rel-16 has heretofore standardized procedures only for intra-CU migration, which is described below.

Intra-CU Topology Adaptation Procedure

During the intra-CU topology adaptation, both the source and the target parent nodes are served by the same IAB-donor-CU. The target parent node may use a different IAB-donor-DU than the source parent node. The source path may further have common nodes with the target path. FIG. 6 shows an example of the topology adaptation procedure, where the target parent node uses a different IAB-donor-DU than the source parent node.

The procedure comprises the following steps:

1. The migrating IAB-MT sends a Measurement Report message to the source parent node gNB-DU. This report is based on a Measurement Configuration the migrating IAB-MT received from the IAB-donor-CU before.

2. The source parent node gNB-DU sends an UL RRC MESSAGE TRANSFER message to the IAB-donor-CU to convey the received Measurement Report.

3. The IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic.

4. The target parent node gNB-DU responds to the IAB-donor-CU with a UE CONTEXT SETUP RESPONSE message.

5. The IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

6. The source parent node gNB-DU forwards the received RRCReconfiguration message to the migrating IAB-MT.

7. The source parent node gNB-DU responds to the IAB-donor-CU with the UE CONTEXT MODIFICATION RESPONSE message.

8. A Random Access procedure is performed at the target parent node gNB-DU.

9. The migrating IAB-MT responds to the target parent node gNB-DU with an RRCReconfigurationComplete message.

10. The target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These DL and UL packets belong to the MT's own signalling and data traffic.

11. The IAB-donor-CU configures BH RLC channels and BAP-layer route entries on the target path between migrating IAB-node and target IAB-donor-DU. This step also includes allocation of TNL address(es) that is (are) routable via the target IAB-donor-DU. These configurations may be performed at an earlier stage, e.g. right after step 3. The new TNL address(es) is (are) included in the RRCReconfiguration message at step 5.

12. All F1-U tunnels and F1-C are switched to use the migrating IAB-node's new TNL address(es).

13. The IAB-donor-CU sends a UE CONTEXT RELEASE COMMAND message to the source parent node gNB-DU.

14. The source parent node gNB-DU releases the migrating IAB-MT's context and responds the IAB-donor-CU with a UE CONTEXT RELEASE COMPLETE message.

15. The IAB-donor-CU releases BH RLC channels and BAP routing entries on the source path. The migrating IAB-node may further release the TNL address(es) it used on the source path.

NOTE: In case that the source route and target route have common nodes, the BH RLC channels and BAP routing entries of those nodes may not need to be released in Step 15.

NOTE: Steps 11, 12 and 15 also have to be performed for the migrating IAB-node's descendant nodes, as follows: The descendant nodes must also switch to new TNL addresses that are anchored in the target IAB-donor-DU. The IAB-donor-CU may send these addresses to the descendant nodes and release the old addresses via corresponding RRC signalling. If needed, the IAB-donor-CU configures BH RLC channels, BAP-layer route entries on the target path for the descendant nodes and the BH RLC Channel mappings on the descendant nodes in the same manner as described for the migrating IAB-node in step 11. The descendant nodes switch their F1-U and F1-C tunnels to new TNL addresses that are anchored at the new IAB-donor-DU, in the same manner as described for the migrating IAB-node in step 12. Based on implementation, these steps can be performed after or in parallel with the handover of the migrating IAB-node. In Rel-16, in-flight packets in Uplink (UL) direction that were dropped during the migration procedure may not be recoverable.

NOTE: In upstream direction, in-flight packets between the source parent node and the IAB-donor-CU can be delivered even after the target path is established.

NOTE: On-going downlink data in the source path may be discarded up to implementation.

NOTE: IAB-donor-CU can determine the unsuccessfully transmitted downlink data over the backhaul link by implementation.

As mentioned above, 3GPP Rel-16 has provided/standardized only intra-CU topology adaptation procedure. Considering that inter-CU migration will be an important feature of IAB Rel-17 Work Item (WI), enhancements to existing procedure are required for reducing service interruption (due to IAB-node migration) and signaling load. For example, if existing mechanisms (in TR 38.874) are adopted for inter-CU migration (Case(D) in FIG. 5) without any optimization/improvement, then a new F1 connection is set up from IAB-node E to the new CU (i.e. CU(2)) and the old F1 connection to the old CU (i.e. CU(1)) is released.

Releasing and relocating the F1 connection will impact all UEs (i.e. $UE_c$, $UE_d$, and $UE_e$) and any descendant IAB nodes (and their served UEs). For example, this may cause service interruption for the UEs and IAB nodes served by the migrating IAB node (i.e. IAB-node E) since these UEs may need to re-establish their connection or to perform handover operation. This may be the case even if they remain under the same IAB node, as 3GPP security principles mandate to perform key refresh whenever the serving CU/gNB is changed (e.g. at handover or reestablishment), i.e. RRC reconfiguration with reconfigurationWithSync has to be sent to each UE. This may also cause a signaling storm, since a large number of UEs, IAB-MTs and IAB-DUs have to perform re-establishment or handover at the same time.

SUMMARY

Some embodiments herein address the above problems by exploiting a proxy-based mechanism where the inter-CU migration is done without handing over the UEs or IAB nodes directly or indirectly being served by the migrating IAB node, thereby making the handover of the directly and indirectly served UEs transparent to the target CU. In particular, only the RRC connection of the migrating IAB node is migrated to the target CU, while the CU-side termination of its F1 connection as well as the CU-side terminations of the F1 and RRC connections of its directly and indirectly served IAB nodes and UEs are kept at the source CU. In this case, the target CU serves as the proxy for these F1 and RRC connections that are kept at the source CU.

In this context, where a proxied based approach for inter-CU migration is exploited for fast inter-CU migration, some embodiments herein disclose signaling and other detailed aspects for facilitating such inter-CU migration.

The considered scenario is as follows: an IAB node (herein referred to as the migrating IAB node) performs inter-CU migration, the RRC connection of the MT of the migrating IAB is relocated to the new CU, while the F1 connection of all the directly/indirectly served child IAB nodes of the migrating IAB node as well as the migrating IAB node itself and the RRC connection of the directly/indirectly served UEs/IAB-MTs are not relocated. Some embodiments herein focus on the signaling aspects for such a scenario. The signaling may comprise one or more of the following: (i) Signaling between the two CUs (i.e. source and target CUs) to indicate a proxied inter-CU migration of the IAB node; (ii) Signaling between the target donor-CU and its donor-DU; (iii) Signaling between the target donor-CU and intermediate IAB-DU; (iv) Signaling between the source donor-CU and the migrating IAB-MT and IAB-DU.

More particularly, according to an aspect, some embodiments include a method in a source Integrated Access Backhaul, IAB, node. The method comprises sending a handover request from the source IAB node to a target IAB node to which a Mobile Termination, MT, of an IAB node is to be migrated. The handover request comprises an indication of a proxied inter donor IAB node migration of the MT to the target IAB node. The method also comprises receiving a handover response in response to the handover request.

In some embodiments, the handover request further comprises information about a list of backhaul, BH, Radio Link Control, RLC, channels over a BH link between the IAB node and a parent IAB node of the IAB node. In one such embodiment, the information about the list of BH RLC channels comprises, for each BH RLC channel in the list, one or more of: a BH RLC channel identity of the BH RLC channel; a Logical Chanel ID for the BH RLC channel; a Quality of Service profile, or a priority, for the BH RLC channel; a Radio Link Control mode for the BH RLC channel; a radio bearer mapping scheme over the BH RLC channel; and, for each Backhaul Adaptation Protocol, BAP, routing identity carried over this BH RLC channel, a mapping between Differentiated Services Code Point and/or an Internet Protocol, IP, flow label and/or an IP address to the BAP routing identity. For example, in one embodiment, the information about the list of BH RLC channels comprises, for at least one BH RLC channel in the list where the radio bearer mapping scheme over the BH RLC channel is a N to 1 mapping, a number of user equipment bearers mapped to the BH RLC Channel.

In some embodiments, the handover request further comprises information indicating a BAP address of the IAB node and/or BAP addresses of one or more children nodes served by the IAB node.

In some embodiments, the handover request comprises an XnAP handover preparation message.

In some embodiments, the source IAB node is a source Centralized Unit (CU) of a source donor IAB node and the target IAB node is a target Centralized Unit (CU) of a target donor IAB node.

In some embodiments, according to the indication of the proxied inter donor IAB node migration, a radio resource control, RRC, connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node.

In some embodiments, the method further comprises, based on the handover response, performing a proxied inter donor IAB node migration of the MT from the source IAB node to the target IAB node.

Other embodiments herein include a method in a target Integrated Access Backhaul (IAB) node. The method comprises receiving a handover request from a source IAB node, the handover request comprising an indication of a proxied inter donor IAB node migration of a Mobile Termination, MT, of an IAB node from the source IAB node to the target IAB node. The method also comprises sending a handover response to the source IAB node.

In some embodiments, the handover request further comprises information about a list of backhaul, BH, Radio Link Control, RLC, channels over a BH link between the IAB node and a parent IAB node of the IAB node. In one such embodiment, the information about the list of BH RLC channels comprises, for each BH RLC channel in the list, one or more of: a BH RLC channel identity of the BH RLC channel; a Logical Chanel ID for the BH RLC channel; a Quality of Service profile, or a priority, for the BH RLC channel; a Radio Link Control mode for the BH RLC channel; a radio bearer mapping scheme over the BH RLC channel; and, for each Backhaul Adaptation Protocol, BAP, routing identity carried over this BH RLC channel, a mapping between Differentiated Services Code Point and/or an Internet Protocol, IP, flow label and/or an IP address to the BAP routing identity. For example, in one embodiment, the information about the list of BH RLC channels comprises, for at least one BH RLC channel in the list where the radio bearer mapping scheme over the BH RLC channel is a N to 1 mapping, a number of user equipment bearers mapped to the BH RLC Channel.

In some embodiments, the method further comprises, for each BH RLC channel in the list, configuring a corresponding BH RLC channel on each of one or more BH hops between the target IAB node and the IAB node.

In some embodiments, the method further comprises, for each BH RLC channel in the list: (i) if the handover request indicates that a radio bearer mapping scheme for the BH RLC channel is a 1:1 scheme, setting up a corresponding BH RLC channel on each of one or more BH hops between the target IAB node and the IAB node; and (ii) if the handover request indicates that a radio bearer mapping scheme for the BH RLC channel is a N:1 scheme, setting up a BH RLC channel with a corresponding Quality of Service profile or priority on a BH hop between the parent node and the IAB node and, for each of one or more BH hops between the target IAB node and the parent node, setting up a BH RLC channel with a corresponding Quality of Service profile or priority on the BH hop if one is not already available for use.

In some embodiments, the handover request further comprises information indicating a BAP address of the IAB node and/or BAP addresses of one or more children nodes served by the IAB node.

In some embodiments, the method further comprises assigning BAP addresses of IAB nodes in paths traversing and/or terminated at the IAB node.

In some embodiments, the handover request comprises an XnAP handover preparation message.

In some embodiments, the source IAB node is a source Centralized Unit (CU) of a source donor IAB node and the target IAB node is a target Centralized Unit (CU) of a target donor IAB node.

In some embodiments, according to the indication of the proxied inter donor IAB node migration, a radio resource control, RRC, connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node.

In some embodiments, the handover response comprises information to help the source IAB node to trigger the migration of the MT only to the target IAB node, while keeping an F1 interface with a Distributed Unit of the IAB node along with user equipment (UE) contexts of UEs served by the IAB node.

In some embodiments, the method further comprises updating a routing table at each intermediate IAB node between the target IAB node and a new parent node of the IAB node for all BAP paths traversing and/or terminated at the IAB node.

In some embodiments, the method further comprises indicating to a distributed Unit, DU, of the target IAB node Internet Protocol, IP, addresses associated with traffic for the IAB node and children nodes of the IAB node; or requesting a DU of the target IAB for new IP addresses for the IAB node and children nodes of the IAB node.

In some embodiments, the method further comprises configuring a distributed Unit (DU) of the target IAB node with a mapping of DSCP and/or IP flow label and/or IP address to a BAP routing identity and a next-hop BH RLC channel mapping that was received in the handover request.

Still other embodiments herein include a method in an Integrated Access Backhaul, IAB, node. The method comprises receiving signaling indicating Backhaul Adaptation Protocol, BAP, addresses assigned by a source IAB node to children nodes of the IAB node and/or BAP addresses assigned by a target IAB node to children nodes of the IAB node.

In some embodiments, the source IAB node and the target IAB node are a source IAB node and a target IAB node of a proxied inter donor IAB node migration of the IAB node.

In some embodiments, according to the proxied inter donor IAB node migration, a radio resource control, RRC, connection of the IAB node is migrated to the target IAB node but F1 connections and RRC connections of any children nodes served by the IAB node are kept at the source IAB node such that the target IAB node is to serve as a proxy for the F1 connections and RRC connections kept at the source IAB node.

In some embodiments, the target IAB node is a target Centralized Unit (CU) of a target donor IAB node.

In some embodiments, the method further comprises, based on the received signaling: (i) translating a destination BAP address of an uplink packet received from a child node of the IAB node from a BAP address assigned by a source IAB node to a BAP address assigned by the target IAB node; and (ii) translating a destination BAP address of a downlink packet destined for a child node of the IAB node from a BAP address assigned by the target IAB node to a BAP address assigned by a source IAB node.

Embodiments herein also include a method in a Mobile Termination, MT, of an Integrated Access Backhaul, IAB, node. The method comprises sending a request message to a target IAB node for establishing a connection between the IAB node and the target IAB node, the request message comprising an indication of a proxied inter donor IAB node migration. The method further comprises receiving, from the target IAB node, a response message in response to the request message. The method also comprises, based on the response message, establishing the connection between the IAB node and the target IAB node.

In some embodiments, the indication is a cause value indicating a cause of the request message as being failure of a backhaul link between the MT and a parent node of the IAB node.

In some embodiments, the request message further comprises a Backhaul Adaptation Protocol, BAP, address assigned to the IAB node by a source IAB node of the proxied inter donor IAB node migration.

In some embodiments, the request message is an RRC Reestablishment Request message.

In some embodiments, the response message is an RRC Reestablishment message.

In some embodiments, the target IAB node is a target Centralized Unit (CU) of a target donor IAB node.

In some embodiments, according to the indication of the proxied inter donor IAB node migration, a radio resource control, RRC, connection of the IAB node is to be migrated to the target IAB node but F1 connections and RRC connections of any children nodes served by the IAB node are to be kept at a source IAB node such that the target IAB node is to serve as a proxy for the F1 connections and RRC connections kept at the source IAB node.

Embodiments herein also include corresponding apparatus, computer programs, and carriers of those computer programs.

According to another aspect, some embodiments include a network node configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to yet another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

Advantages/technical benefits of some embodiments herein may include that the proposed signaling enhancements enable the proxied inter-CU migration, where the handover (HO) process is transparent to all the UEs along with IAB nodes served directly/indirectly by the migrating IAB node, making the HO process more efficient compared to existing approaches, due to reduced interruption time and signaling overhead.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Exemplary embodiments will be described in more detail with reference to the following figures, in which.

DETAILED DESCRIPTION

Figure 1:
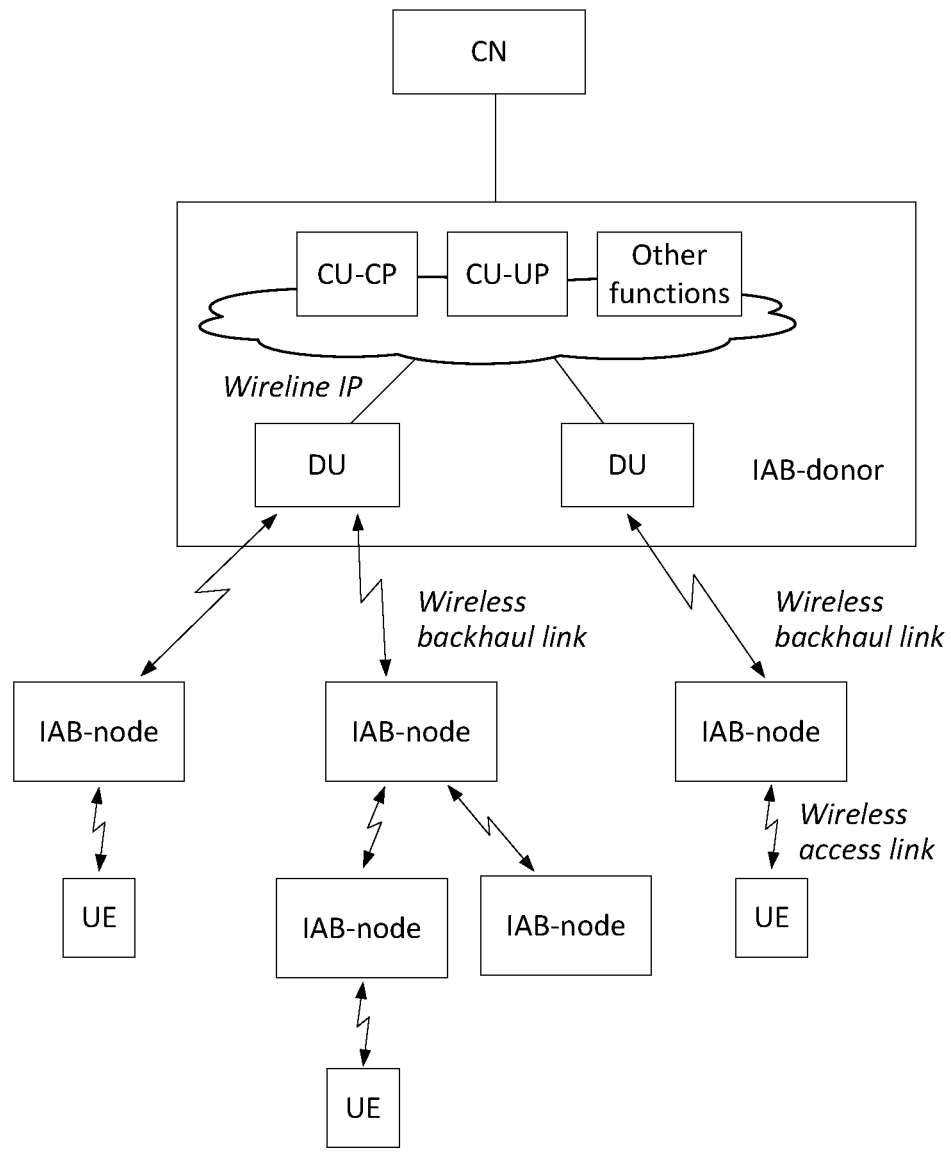
FIG. 1 illustrates a reference diagram for IAB-architectures.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Terminology

The terms "F1AP connection" and "F1 association" are used interchangeably.

The terms "gNB-CU", "IAB-Donor-CU", "CU-CP", and "CU" are used interchangeably.

The terms "old CU", and "source CU" are used interchangeably.

The terms "new CU" and "target CU" are used interchangeably.

The terms "IAB-Donor DU" and "Donor-DU" are used interchangeably.

The terms "backhaul RLC channel" and "BH RLC channel" and "BH bearer" are used interchangeably.

The terms "handover", "migration", and "relocation" are used interchangeably.

The term "a UE/IAB node directly served by the migrating IAB node" refers to a UE/IAB node that is directly connected to the migrating IAB node.

The term "a UE/IAB node is indirectly served by the migrating IAB node" means that the migrating IAB node is an ancestor node to an IAB node that is currently serving the UE or IAB node.

The term "concerned UE/IAB" node refers to a UE/IAB node that is directly/indirectly being served by the migrating IAB node.

The term "source parent node" refers to the node that was serving the migrating IAB node before the handover (i.e. a source donor DU in case the migrating IAB node was just one hop away from the source CU, or a parent IAB node, in case the migrating IAB node was multiple hops away from the source CU).

The term "target parent node" refers to the node that will serve the migrating IAB node after the handover (i.e. a target donor DU in case the migrating IAB node will be connected just one hop away from the target CU, or a parent IAB node, in case the migrating IAB node will be multiple hops away from the target CU).

The term "child IAB node" includes all descendants of an IAB node, i.e. both directly and indirectly served IAB nodes (i.e. not only the directly connected children, but also children's children and so on).

Figure 7:
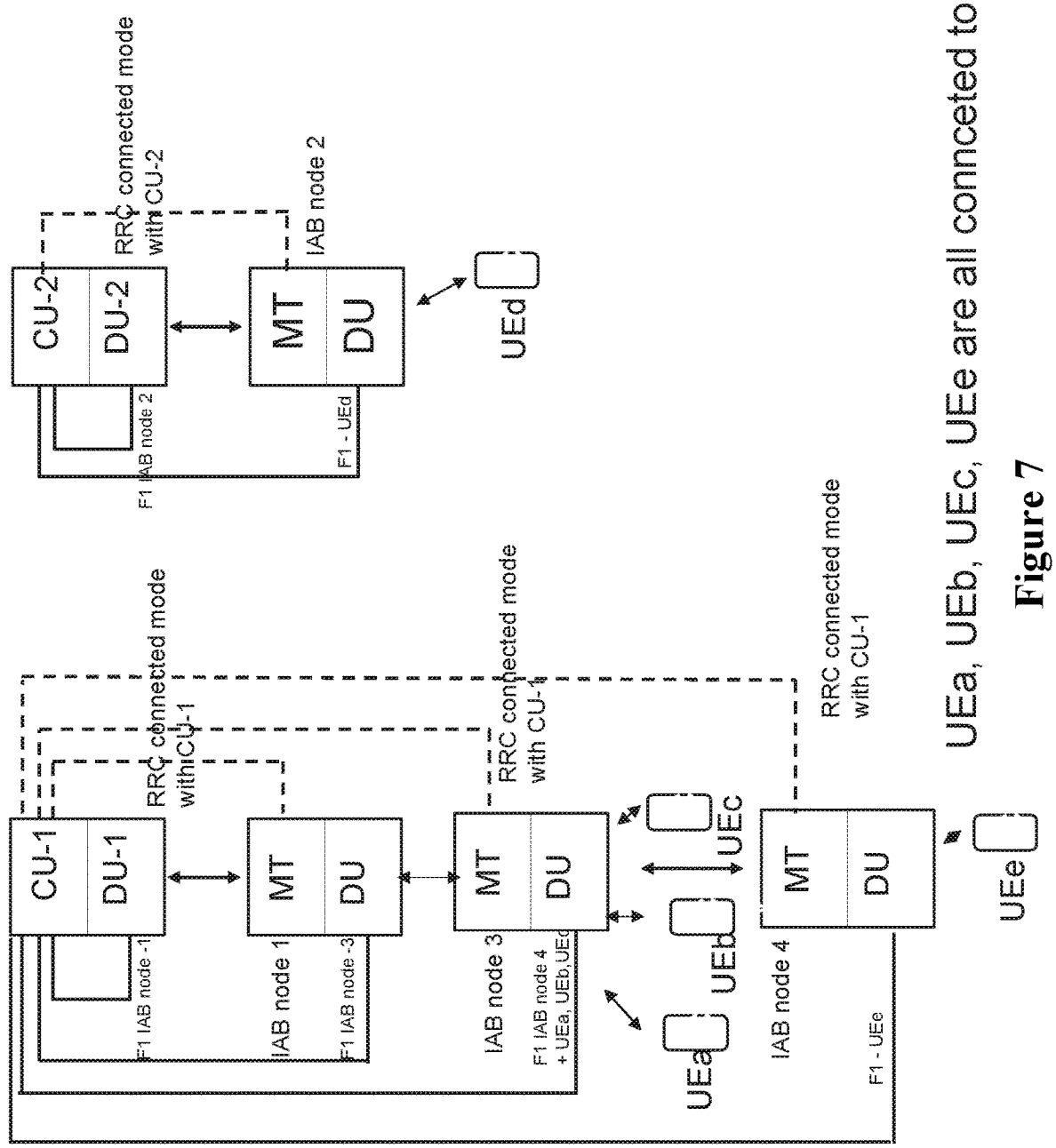
FIG. 7 is an example of signal flow before IAB-node 3 migration.
Figure 8:
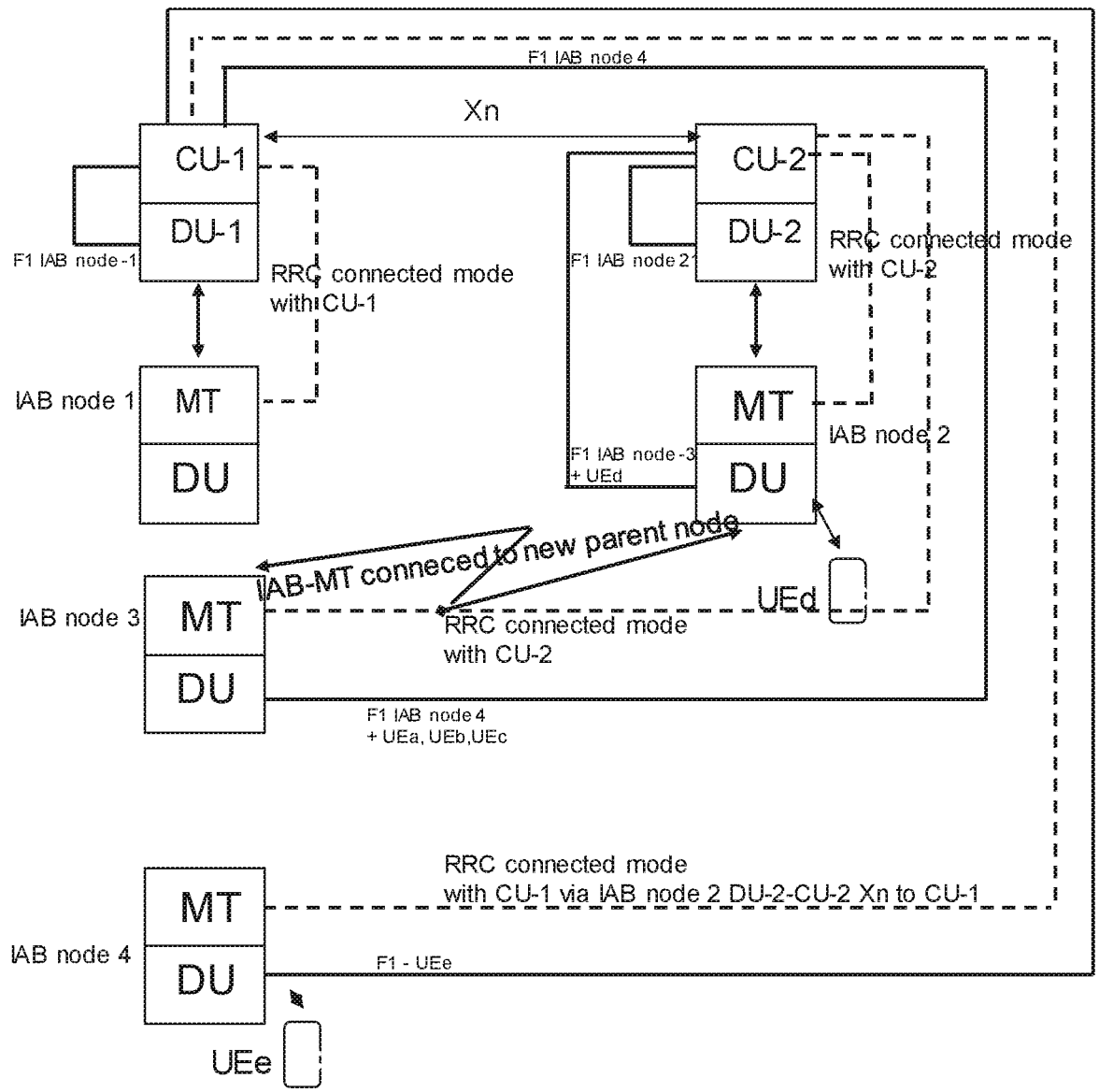
FIG. 8 is an example of signal flow after IAB-node 3 migration.

The example topology shown in FIGS. 7-8 is used for the embodiments of this disclosure, where IAB-node 3 DU has an F1AP connection with IAB-Donor CU1 (i.e. CU1), while the MT functionality of the IAB-node 3 (i.e. IAB-MT-3) is connected to/served by IAB-node 1. In particular, FIG. 7 illustrates the protocol stacks and signal flow when the F1 connections are maintained in the CU-1, while FIG. 8 highlights how the F1-U is tunnelled over the Xn and then transparently forwarded to the IAB donor-DU-2 after the IAB node is migrated to the target donor CU (i.e. CU2).

The inter-CU IAB node migration may be caused by e.g., radio link failure (RLF), load balancing, or IAB node mobility. These are non-limiting examples.

All considerations for a split donor (i.e. donor CU) are equally applicable for a non-split donor (i.e. donor gNB).

The term "gNB" applies to all variants therein, e.g. "gNB", "en-gNB" etc.

All the cells of the DUs controlled by the same donor CU (i.e. the donor DU and the IAB-DUs of all IAB nodes that are under the same donor CU) are also referred to as being served by the donor CU.

Embodiments herein are presented using a non-limiting example of Xn handover, but they are applicable to the NG, S1 and X2 handovers as well.

Network-Initiated Migration

Figure 9:
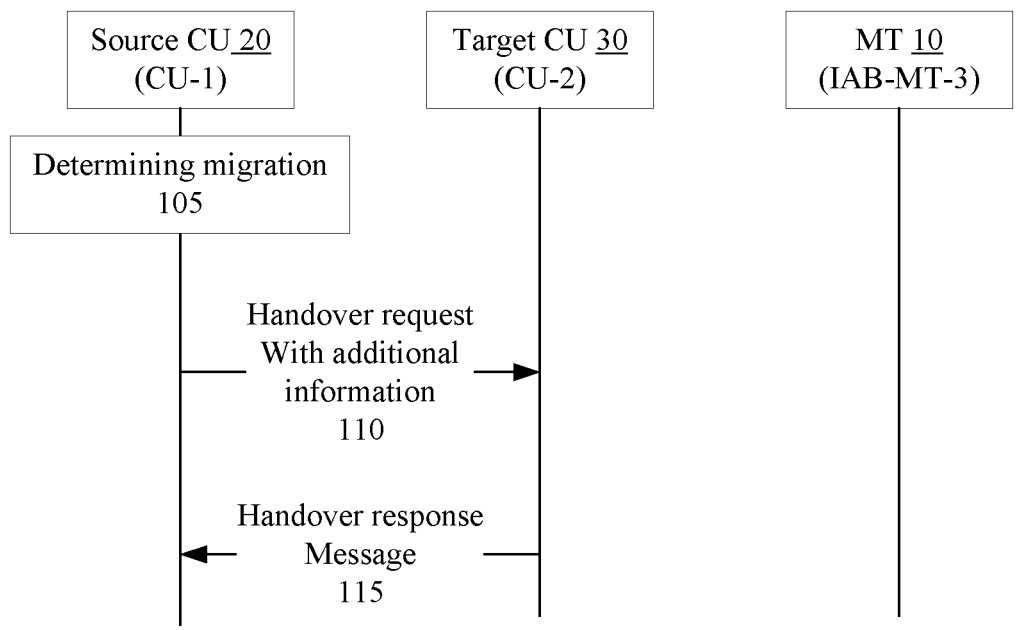
FIG. 9 illustrates a signaling diagram of a network-initiated migration.

For example, FIG. 9 illustrates a signaling diagram for a network-initiated migration.

IAB-MT 10 (i.e. IAB-MT-3 in FIGS. 7 and 8) is in CONNECTED mode at the old CU20 (i.e. Donor-CU1 in FIG. 7) and the IAB-node migration is initiated by the network (i.e., Donor-CU1). In step 105, once the source Donor-CU20 (i.e. CU1) decides to migrate the IAB-MT 10 to the target Donor-CU30 (i.e. CU2 in FIGS. 7 and 8) due to any reason (such as load balancing, etc.), the source Donor-CU20 will trigger the handover procedure (step 110), similar to Rel-15 UE handover procedure but with some IAB-specific enhancements provided below. As shown, for example, the source Donor-CU20 triggers the handover procedure by sending a handover request, with additional information, to the target CU30.

Enhancements for Xn Signalling from Source Donor-CU to Target Donor-CU

The following information elements can either be added in the existing XnAP handover preparation message (i.e. HANDOVER REQUEST) or defined as a new XnAP message, for sending from the Source CU20 to the Target CU30 in Step 110 of FIG. 9.

The information elements may include the list of backhaul (BH) Radio Link Control (RLC) channels over the BH link between the migrating IAB node and its parent node (i.e. the link between IAB-node-3 and IAB-node-1). The list may for example contain BH RLC channel ID, logical channel ID (LCID), and/or RLC mode. The list may alternatively or additionally contain one of the following: quality of service (QoS) profile (for UP BH RLC channel), Priority (for a CP BH RLC channel), or an indication of whether this is a BAP control PDU channel. In some embodiments, the list may contain information indicating whether the radio bearers carried over this channel are 1:1 mapped or N:1 mapped. In case, the list contains information indicating that the radio bearers are N:1 mapped, the list may possibly contain additional information, such as how many UE bearers are mapped to it. Alternatively or additionally, the list may contain, ror each BAP routing ID carried over this BH RLC channel, the mapping between Differentiated Services code Point (DSCP) and/or Internet Protocol (IP) flow label and/or Internet Protocol (IP) address to these BAP routing IDs. In the example scenario, at the source path, the (DSCP/flow label/IP address <-> BAP routing ID X) mapping is executed at the source donor DU, whereas the packets with BAP routing ID X are carried between IAB-node-1 and IAB-node-3 on the BH RLC channel with BH RLC channel ID=Y.

Alternatively or additionally, the information elements added in the existing XnAP handover preparation message, or defined as a new XnAP message, may include: the BAP address of the migrating IAB node [M] (i.e. IAB-node-3), the BAP addresses of the children nodes (directly and indirectly served) by the migrating IAB node (i.e., IAB-node-4), and/or an indication that this is a proxy HO.

In one embodiment, the source CU20 can request a full HO (i.e. handover of all RRC and F1 connections of all the concerned IAB DUs, IAB-MTs and UEs), and the target CU30 may respond with a proxy HO response (e.g. if the target doesn't have sufficient F1 resources).

Enhancements for Xn Signalling from Target Donor-CU to Source Donor-CU

In response to the handover request of step 110 in FIG. 9, the target donor-CU30 (i.e. donor-CU2) will send a handover response message to the source CU20 (step 115). The response message may contain information that will facilitate the source donor-CU20 to trigger the migration of the IAB-MT 10 only, while keeping/maintaining the F1 interface with the migrating IAB node DU along with the UE contexts of all the UEs served by the migrating IAB-node 10. For this purpose, either the existing HANDOVER REQUEST ACKNOWLEDGE message will be enhanced with new information elements or a new XnAP message can be defined. This could also require some new F1 messages or additional information elements in existing messages to make the necessary updates.

Actions and Signalling at the Target Donor-CU, Target Donor DU, and DUs of the IAB Nodes Along the New Path to the Migrated IAB Node If the target node 30 (i.e. Donor-CU2) accepts the handover, it will perform a set of actions (either in parallel, in sequence, or concurrently), which requires enhancements or additional information elements in the F1 signalling between the target donor-CU30 and the DU functionality of each intermediate node (i.e. donor DU, DU of intermediate IAB node, DU of the target parent node) that forwards the traffic between the migrated IAB node 10 and the target donor CU30. Additional information elements will be required for the following tasks.

One task is to, for every 1:1 mapped BH RLC channel indicated, set up a dedicated BH RLC channel on each BH link/hop until the migrated IAB node (with the same QoS profile or priority as indicated in the handover (HO) request).

Another task is to, for every N:1 mapped BH RLC channel indicated in the Xn signalling from source CU20 (donor-CU1) to target CU30 (donor-CU2), set up a BH channel with the corresponding QoS profile or priority on the link between the parent node and the migrating IAB node. And, on every other BH link/hop, check if there is an N:1 mapped BH RLC channel that has the same QoS profile/priority, and, if necessary, if there already exists BH RLC channels used for carrying BAP control PDUs, (optionally) consider also the number of bearers that are indicated to be mapped on the BH RLC channel being migrated. If no such N:1 mapped BH RLC channel exists, or there is one but there are already too many UE bearers mapped to it, a new BH RLC channel will be created/set up. If not, an already existing N:1 mapped BH RLC channel will be used.

Yet another task is to update the routing/mapping table at each intermediate IAB-node between the target donor-DU and the new parent node for all the BAP paths traversing and/or terminated at the migrating IAB-node.

A further task is to perform the normal F1 signalling for handing over the IAB-MT 10 of the migrating node, i.e. F1 context setup, etc.

Still another task is for the target CU30 (i.e. donor-CU2) to check to see if the indicated BAP addresses of the concerned IAB nodes, used at the source donor 20, are used under the target donor. If this is the case (i.e. one or more BAP addresses used at the source donor occupied at the target donor), new BAP addresses are assigned corresponding to each non unique BAP address. One option could be that for boundary regions, where some IAB nodes can migrate, or their parents could migrate, BAP addresses could be reserved for them to ensure they are not reused in a neighbouring CU.

For the donor DU, the target donor-CU30 (i.e. donor-CU2) will inform/indicate to the target donor-DU (i.e. donor-DU2) the IP addresses associated with the traffic for the migrating IAB node 10 and its direct/indirect children nodes, enabling the target donor-DU to make exceptions for these IP addresses or treat them differently (i.e., not to filter them out due to the fact that they will have IP prefixes pertinent to the source donor-CU and DUs). This will facilitate the HO process transparency for the direct/indirect children nodes of the migrating IAB node. Another option for the donor DU could be that the target donor-CU20 (i.e. donor-CU2) will ask the target donor-DU (i.e. donor-DU2) for new IP addresses for the migrating IAB node and the other involved nodes (and also provide to it the BAP addresses, either new or old ones, depending if there was a conflict or not). The target donor-DU (i.e. donor-DU2) will allocate the IP addresses, and send them to the target donor-CU30 (i.e. CU2). The source donor-CU20 (i.e. CU1) will get the information about the new IP addresses (from the source donor-CU30) and will use them from there on instead of the old IP addresses, but it can use the same DSCP/IP flow as before. Another option is that the target donor-DU will act as a destination IP address translator (it gets an UL packet that has the new IP address, then it inserts the old IP address into the packet before forwarding to its donor-CU).

The target donor-CU30 will configure the target donor DU with the mapping of Differentiated Services Code Point (DSCP) and/or IP flow label and/or IP address to the BAP routing ID and the next-hop BH RLC channel mapping that was received in the HO request.

Actions at the Migrating IAB-Node DU

The migrating IAB node will act like a BAP address translator on both DL and UL.

In the UL direction, the children nodes of the migrating IAB node will still use the BAP address of the source donor-CU (i.e. donor-DU1) as destination address. When the migrating IAB node receives such a packet, it will replace the destination BAP address in the UL packet (the BAP address of the source donor-CU20) with the target donor-DU (i.e. donor-DU2) BAP address.

In the DL direction, packets may arrive with new BAP addresses (assigned by the target donor-CU30, i.e. donor-CU2) for the children IAB nodes of the migrating IAB node. The migrating IAB node will change these addresses to the old BAP addresses (i.e. the ones assigned by the source donor-CU20) before forwarding the packets to its DU or consulting the routing table for downstream routing of the packets.

The migrating IAB node needs to be informed about the following BAP addresses and/or BAP routing IDs that are used at the target donor: (i) Its own BAP address/routing IDs; (ii) BAP addresses/Routing IDs of all the nodes that the migrating IAB node is serving directly or indirectly; (iii) BAP address/routing ID of the new parent node; (iv) BAP address/routing ID of the target DU.

The BAP addresses/routing IDs and their mapping with the old addresses can be communicated to the migrating IAB node either from the target CU30 (e.g. in the HO RRC message or a subsequent RRC message to the IAB-MT 10) or the target CU30 could send the new BAP addresses to the source CU20 and the source CU20 can inform the migrating IAB node via F1 signalling.

The migrating IAB node could also be provided with additional information regarding the type of handover (in the HO RRC message or via F1 signalling). For example, the additional information may include an Information Element (IE) to indicate whether it is an inter- or intra-CU migration. As another example, the additional information may include an IE to indicate whether it is a full-fledged group HO or proxied HO.

In another embodiment, although the BH connectivity for the migrated IAB node and its children and served UEs is managed by the target CU30, the traffic between the source CU20 and the target donor DU is sent directly, i.e., it circumvents the target donor CU30 (the so-called direct forwarding). This would result in lower communication latency. In this case, for communicating with the migrated IAB node and its children and served UEs, the source CU20 may need to use the IP addresses provided to it by the target CU30 (i.e. IP addresses from the domain of the target donor DU).

IAB-MT Initiated Migration Due to RLF with Parent Node

Figure 10:
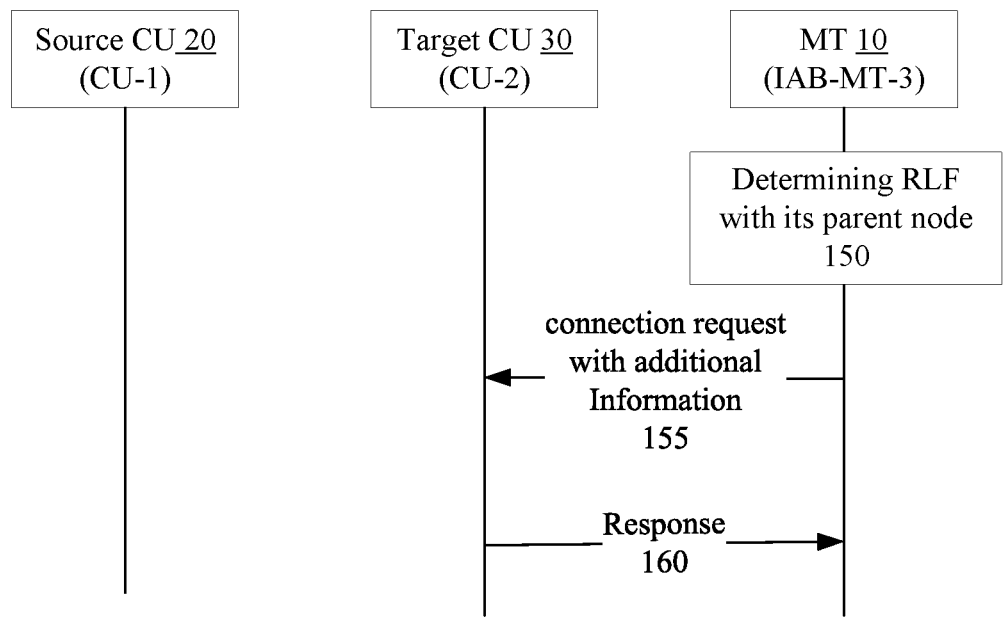
FIG. 10 illustrates a signaling diagram of a MT-initiated migration.

For example, FIG. 10 illustrates a signaling diagram for an IAB-MT initiated migration.

In step 150, the IAB-MT 10 may determine a RLF with its parent node.

In step 155, the IAB-MT 10 (i.e. IAB-MT-3) will initiate an RRCReestablishmentRequest message to the target Donor-CU30 (CU2) with the following new IEs: (i) a new ReestablishmentCause value set to "BH_link_failure" for instance, which will help the target donor-CU30 to know that the IAB-MT 10 is an IAB node that is reestablishing the RRC connection, and not a UE; and (ii) a new IE for sending the IAB-node BAP address in the RRCReestablishmentRequest message, which the target Donor-CU30 can later use in the Xn messages with the source Donor-CU20. From the above new IEs values, the target Donor-CU30 (i.e. CU2) knows that the RRCReestablishment is sent by an IAB-MT 10, not UE. The target Donor-CU30 will correspondingly send an Xn signalling message containing the BAP address/routing ID of the IAB-MT 10 over all the Xn interfaces with the neighbouring Donor-CUs. This Xn signalling message can either be a new message or an enhanced version of the RETRIEVE UE CONTEXT REQUEST message with new IEs for: (i) the BAP address/routing ID of the IAB-node-MT (e.g. IAB-MT-3); and/or (ii) other additional identifiers (such as cause value for "BH_link_failure" with previous parent node etc.).

Only the neighbour Donor-CU (i.e. CU1 in this case) that has assigned the BAP address/routing ID to one of its IAB nodes (i.e. IAB-node 3) that is no longer connected/responding (due to BH RLF or other reason) will respond to the Xn signalling message from the target Donor-CU30. Again, for the response, either a new Xn message or an enhanced version of the RETRIEVE UE CONTEXT RESPONSE message can be used. In the RETRIEVE UE CONTEXT RESPONSE message, the source Donor-CU20 (i.e. CU1) will indicate to the target Donor-CU30 the information described above under the "enhancements for Xn signalling from source donor-CU to target donor-CU" subsection.

In case the target Donor-CU30 can provide the resources and Quality of Services (QoS) requirements reported/sent in the RETRIEVE UE CONTEXT RESPONSE message, the target Donor-CU30 will send an RRCReestablishment message (or response message) to IAB-MT-3 (step 160). Otherwise, the target Donor-CU30 will send RRCSetup message to IAB-MT-3 and will also inform the source Donor-CU20 (via a new Xn signalling message or an enhanced version of the HANDOVER CANCEL signaling message) that the target Donor-CU30 cannot support the required load (i.e., BH RLC channels and radio resources required to support the UEs and IAB-nodes served/connected to IAB-DU-3) of the IAB-node 3. Upon receiving this information from the target Donor-CU30, the source Donor-CU20 (i.e. CU1) will release the UE context of all the UEs served by IAB-DU-3, F1 interface with IAB-DU-3 and the UE context of IAB-MT-3. Furthermore, the IAB-MT-3, upon receiving the RRCSetup message from the target Donor-CU30, will inform the IAB-DU-3 via the internal interface between them that the RRC re-establishment has failed. The IAB-DU-3 will then send a BH RLF notification message (i.e. "Failed to re-establish BH link") to its children IAB nodes and connected UEs so that they can camp on an alternative parent node.

However, upon receiving the RRCReestablishment message, the IAB-MT 10 will know that the RRC connection will be successfully re-established. Later, the target Donor-CU30 (i.e., CU2) will provide either a subset (or full set) of the configuration information elements described above under the "Actions at the migrating IAB-node DU" to the IAB-MT-3 and IAB-DU-3, respectively, which the IAB-node-3 will then employ to re-establish/resume F1-C for the IAB-DU-3. After this step, the rest of the procedure for IAB-MT initiated RRC-Reestablishment and handover (in an inter-CU scenario) is the same as that for the network-initiated case.

Figure 11:
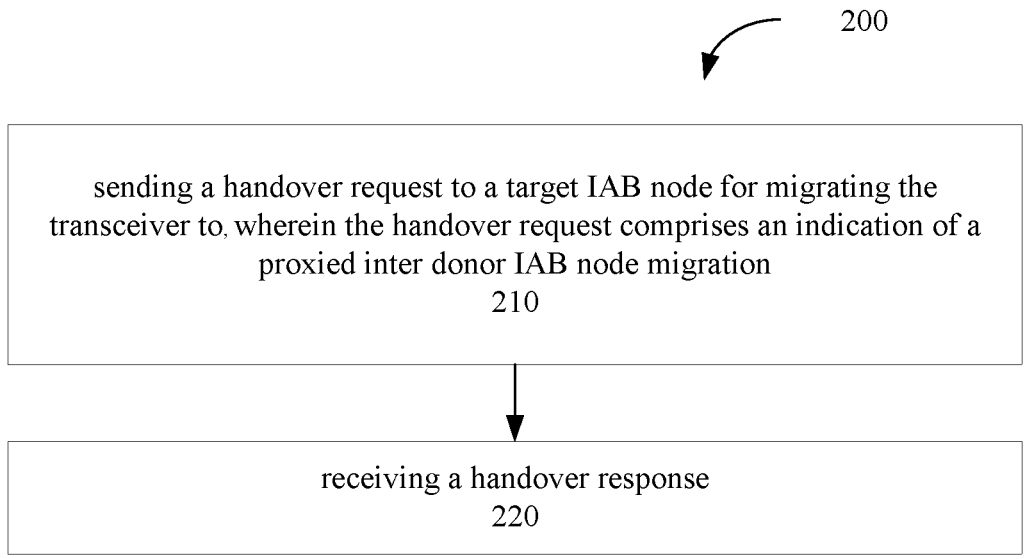
FIG. 11 is a flow chart of a method in a source network node, in accordance with an embodiment.

Now turning to FIG. 11, a method 200 in a source IAB node (e.g. CU20) for performing a handover will be described. Method 200 can be implemented in a network node (such as an IAB node), such as 320 of FIG. 14. Method 200 comprises:

Step 210: sending a handover request to a target IAB node (e.g., target CU30) for migrating the MT (e.g., MT 10) to, wherein the handover request comprises an indication of a proxied inter donor IAB node migration;

Step 220: receiving a handover response.

Several examples of this method and details have been described above. See for example, section entitled "Enhancements for Xn signalling from source donor-CU to target donor-CU" for more detail. For example, the source IAB node may send other information to the target IAB node.

As a note, the target IAB node can be the target CU30 (e.g. CU2 of FIG. 8). The source CU20 can be CU-1 of FIG. 8 and the IAB node can be the migrating IAB node 3, which has a MT and a DU. The MT of IAB node 3 is migrated to CU-2 but the DU of IAB node 3 stays with CU-1. The proxied inter donor IAB node migration refers to a proxied inter-CU migration.

Figure 12:
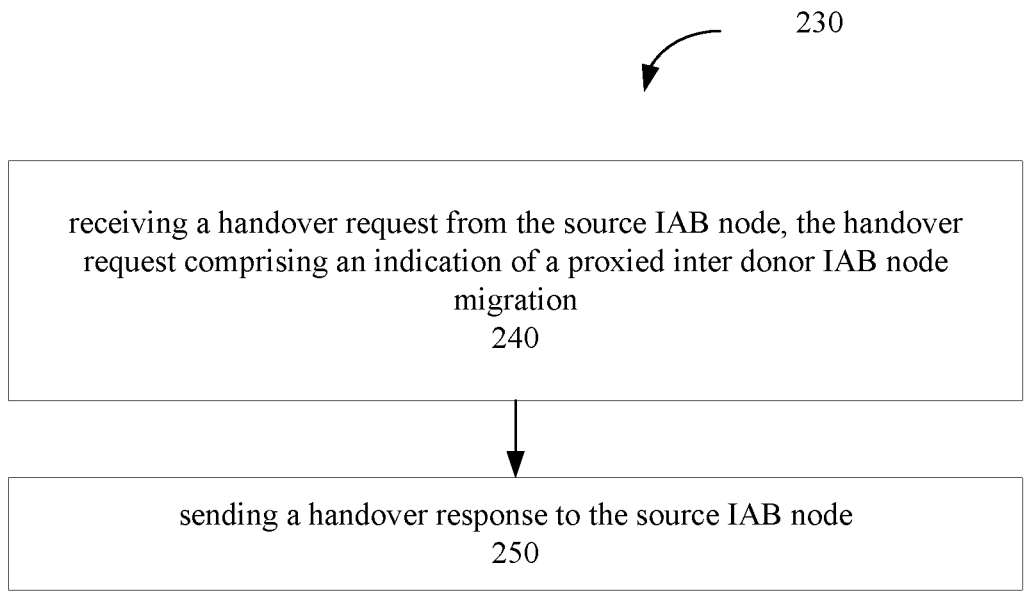
FIG. 12 is a flow chart of a method in a target network node, in accordance with an embodiment.

Now turning to FIG. 12, a method 230 in a target IAB node (e.g. target CU30) will be described. The IAB node can be the network node 320 of FIG. 14. Method 230 comprises:

Step 240: receiving a handover request from the source IAB node (e.g., source CU20), the handover request comprising an indication of a proxied inter donor IAB node migration.

Step 250: sending a handover response to the source IAB node.

Several examples of this method and details have been described above. See for example, sections entitled "Enhancements for Xn signalling from target donor-CU to source donor-CU" and "Actions and signalling at the target donor-CU, target donor DU, and DUs of the IAB nodes along the new path to the migrated IAB node".

As a note, the target IAB node can be the target CU30 (e.g. CU2 of FIG. 8). The source CU20 can be CU-1 of FIG.

8 and the IAB node is the migrating IAB node 3, which has a MT and a DU. The MT of IAB node 3 is migrated to CU-2 but the DU of IAB node 3 stays with CU-1. The proxied inter donor IAB node migration refers to a proxied inter-CU migration.

Figure 13:
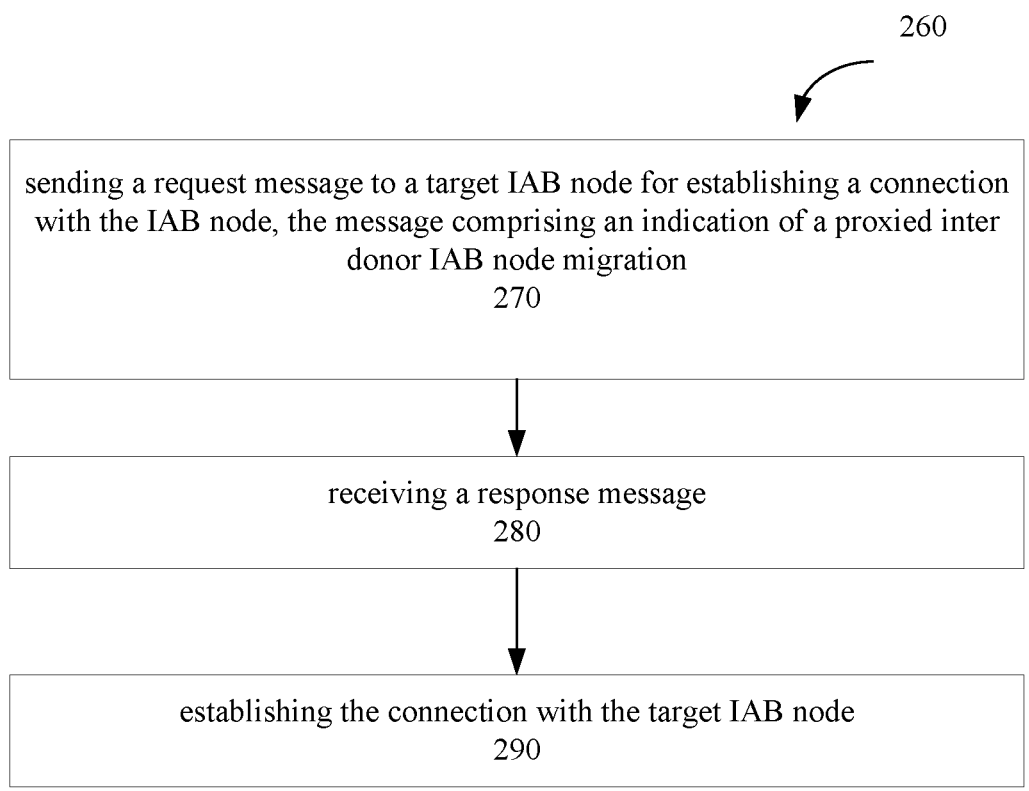
FIG. 13 is a flow chart of a method in a MT of a network node, in accordance with an embodiment.

Now turning to FIG. 13, a method 260 in an IAB node (e.g. MT 10) will be described. The IAB node can be the network node 320 of FIG. 14. Method 260 comprises:

Step 270: sending a request message to a target IAB node (e.g., target CU30) for establishing a connection with the IAB node, the message comprising an indication of a proxied inter donor IAB node migration.

Step 270: receiving a response message.

Step 280: establishing the connection with the target IAB node.

Several examples of this method and details have been described above. See for example, sections entitled "Actions at the migrating IAB-node DU" and "IAB-MT initiated migration due to RLF with parent node"

As a note, the target IAB node can be the target CU30 (e.g. CU2 of FIG. 8). The source CU can be CU-1 of FIG. 8 and the IAB node is the migrating IAB node 3, which has a MT and a DU. The MT of IAB node 3 is migrated to CU-2 but the DU of IAB node 3 stays with CU-1. The proxied inter donor IAB node migration refers to a proxied inter-CU migration.

Figure 14:
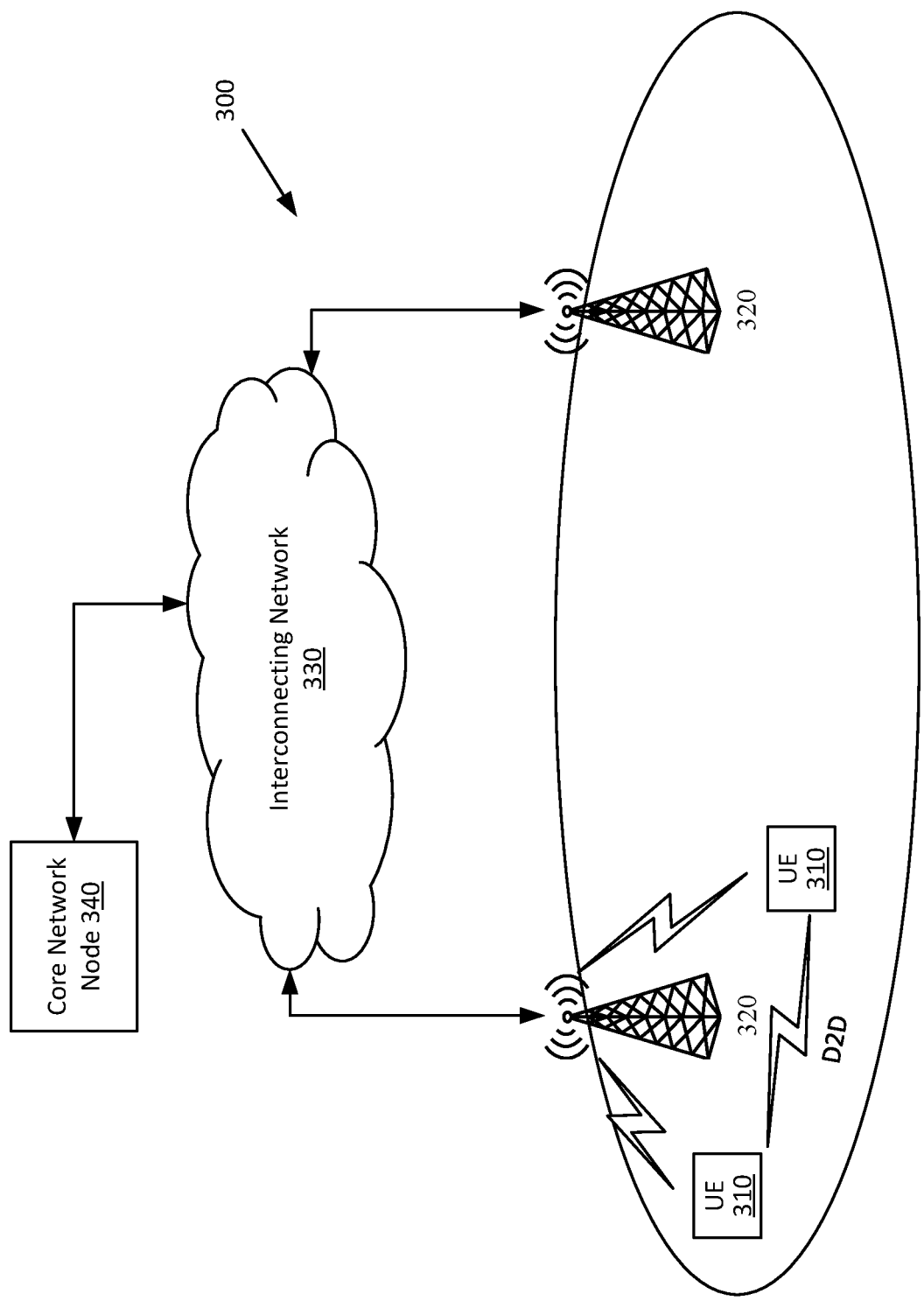
FIG. 14 illustrates one example of a wireless communications system in which embodiments of the present disclosure may be implemented.

FIG. 14 illustrates an example of a wireless network 300 that may be used for wireless communications. Wireless network 300 includes UEs 310 and a plurality of radio network nodes 320 (e.g., Node Bs (NBs) Radio Network Controllers (RNCs), evolved NBs (eNBs), next generation NB (gNBs), etc.) directly or indirectly connected to a core network 330 which may comprise various core network nodes. The network 300 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 310 may be capable of communicating directly with radio network nodes 320 over a wireless interface. In certain embodiments, UEs may also be capable of communicating with each other via device-to-device (D2D) communication. In certain embodiments, network nodes 320 may also be capable of communicating with each other, e.g. via an interface (e.g. X2 in LTE or other suitable interface).

As an example, UE 310 may communicate with radio network node 320 over a wireless interface. That is, UE 310 may transmit wireless signals to and/or receive wireless signals from radio network node 320. The wireless signals may contain voice traffic, data traffic, control signals, and/or any other suitable information. In some embodiments, an area of wireless signal coverage associated with a radio network node 320 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

Figure 2:
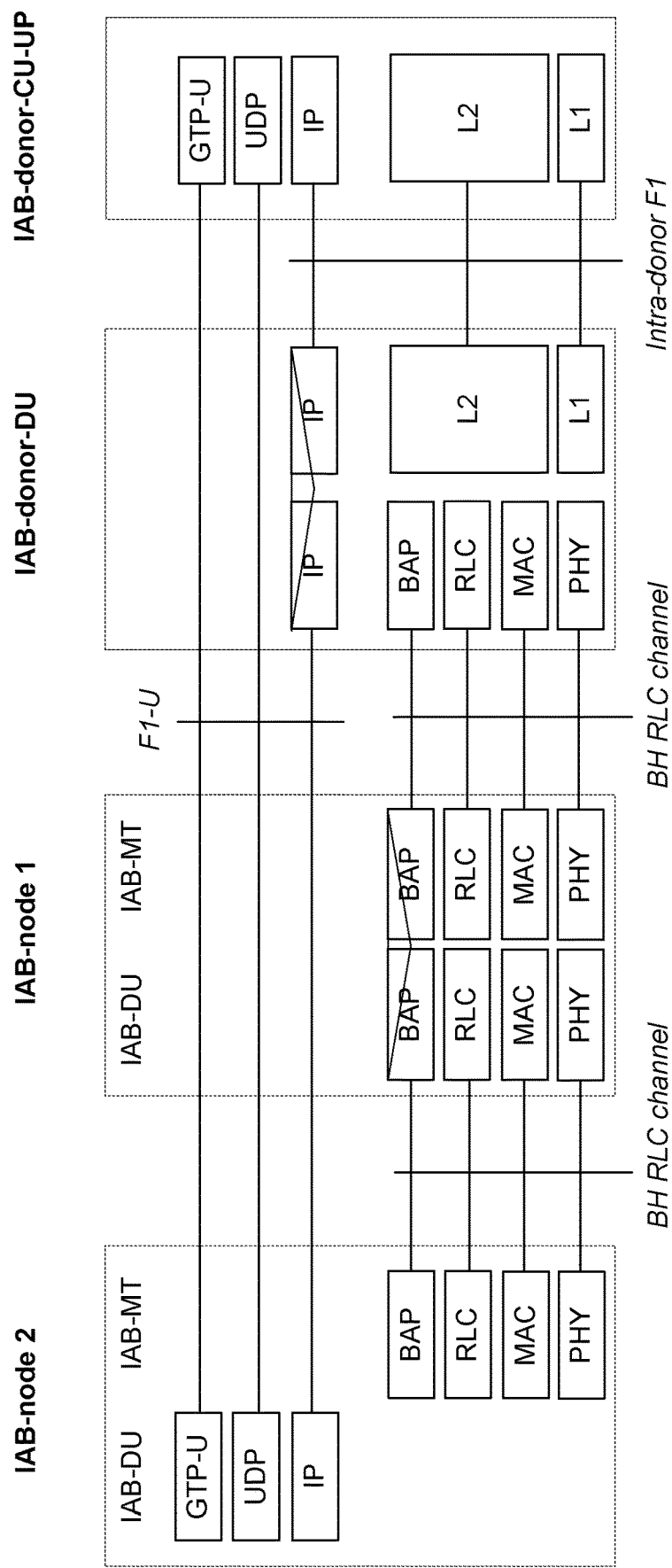
FIG. 2 illustrates a baseline User Plane (UP) Protocol stack for IAB in rel-16.
Figure 3:
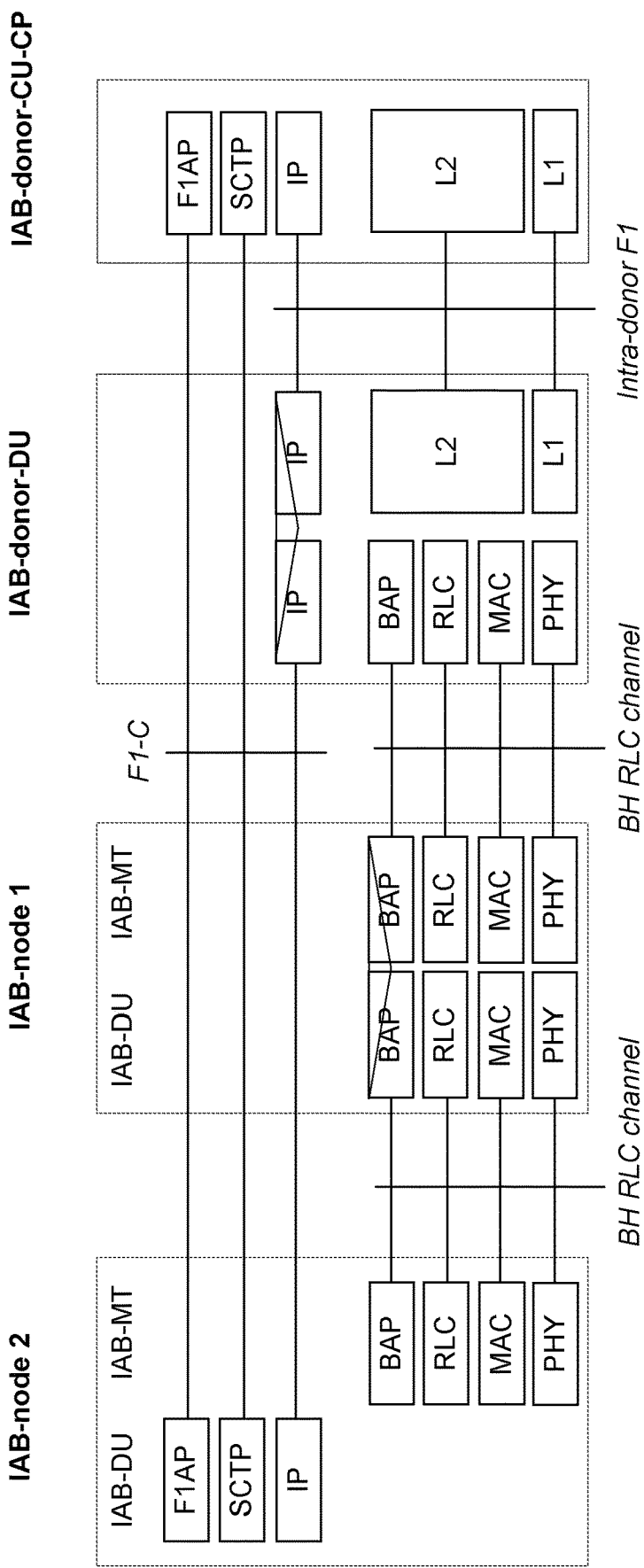
FIG. 3 illustrates a baseline Control Plane (CP) Protocol stack for IAB in rel-16.
Figure 4:
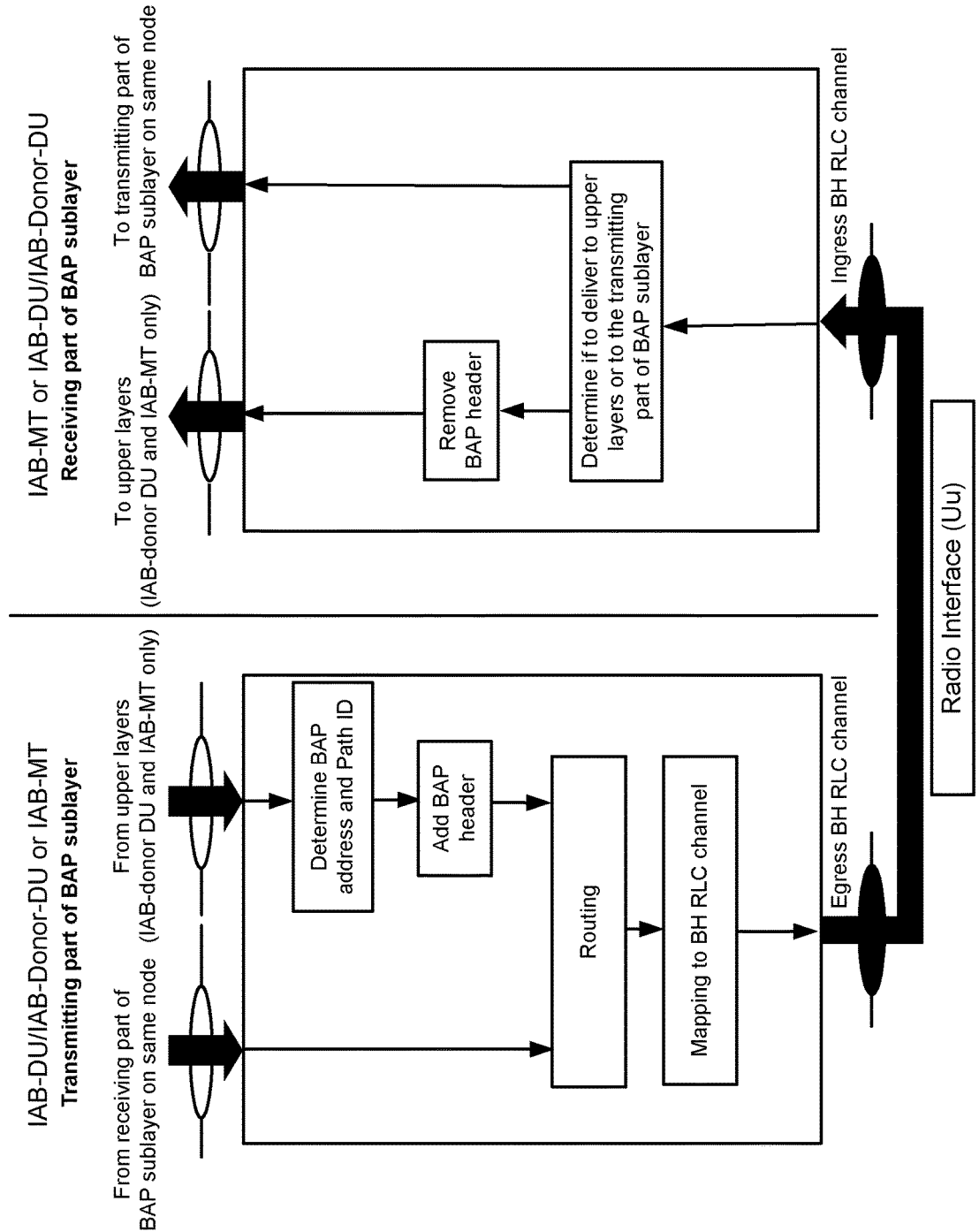
FIG. 4 illustrates an example of functional view of BAP sublayer.
Figure 5:
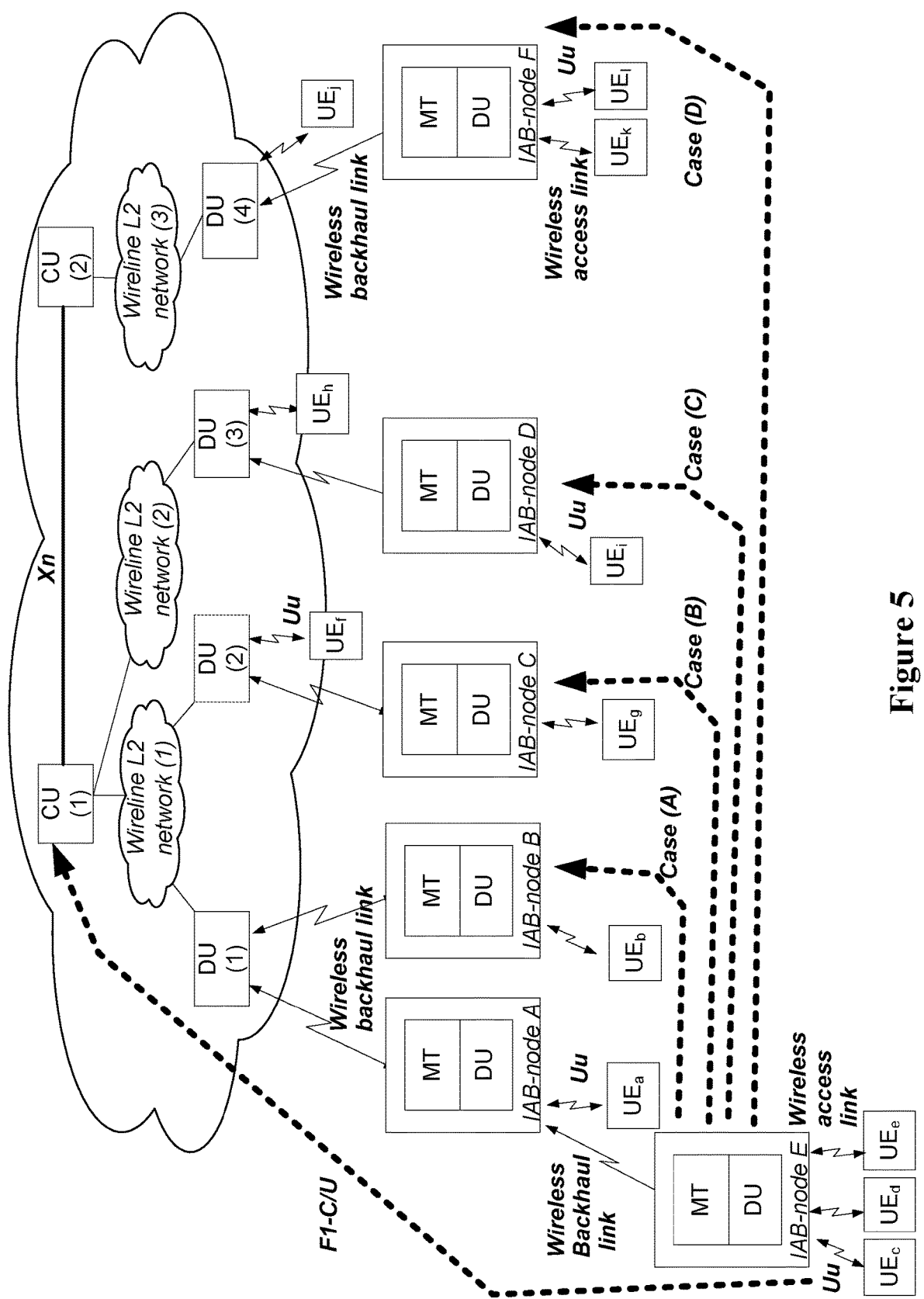
FIG. 5 illustrates an example of different possible scenarios for IAB-node migration.
Figure 6:
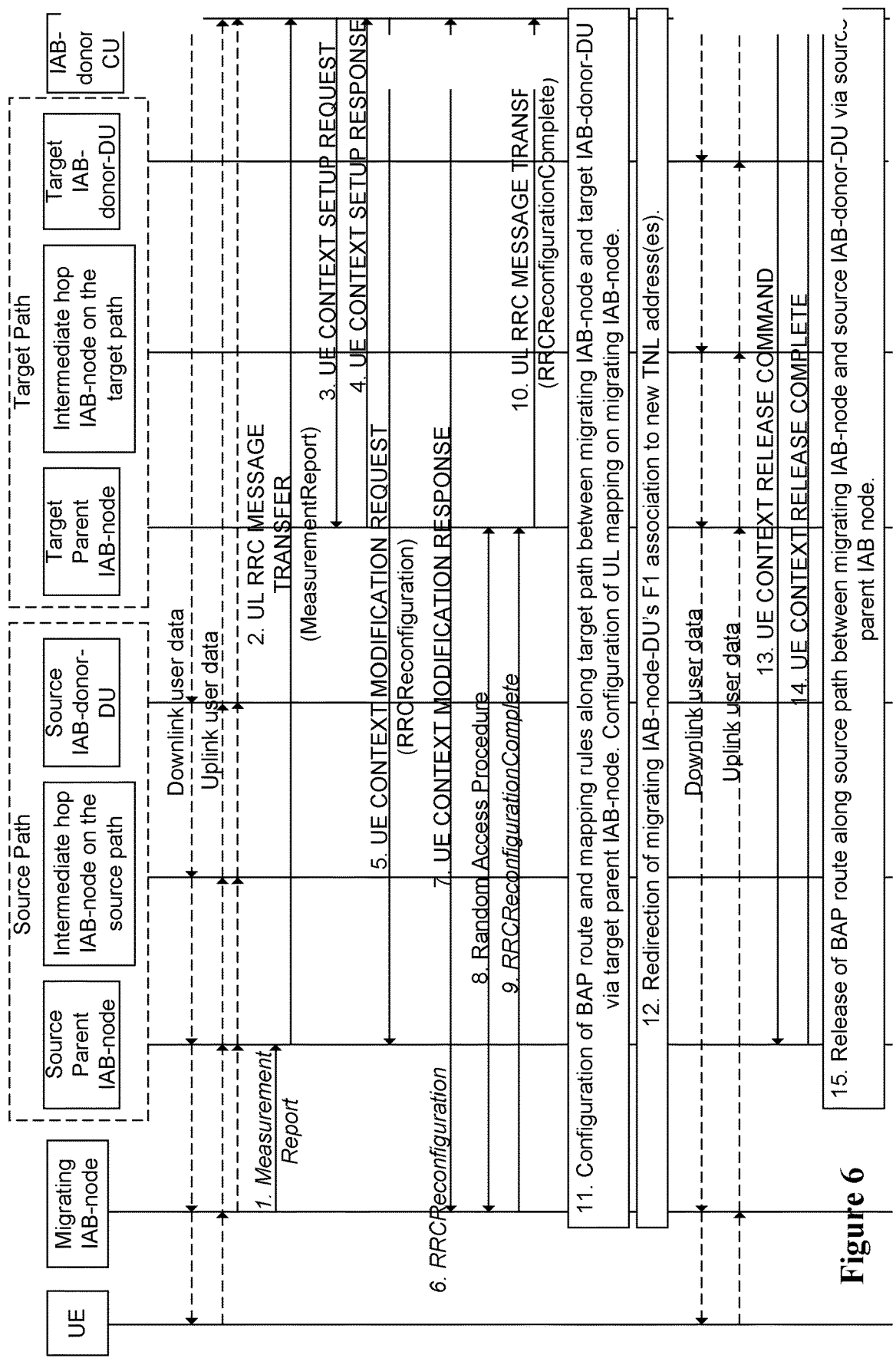
FIG. 6 is an example of an IAB intra-CU topology adaptation procedure.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment. The network node 320 may be an IAB node, a child IAB node, a parent IAB node or an IAB donor. Furthermore, the IAB node 320 may have components as a MT and/or DU (see for example FIGS. 2-3, 5).

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 110 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 14 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 15:
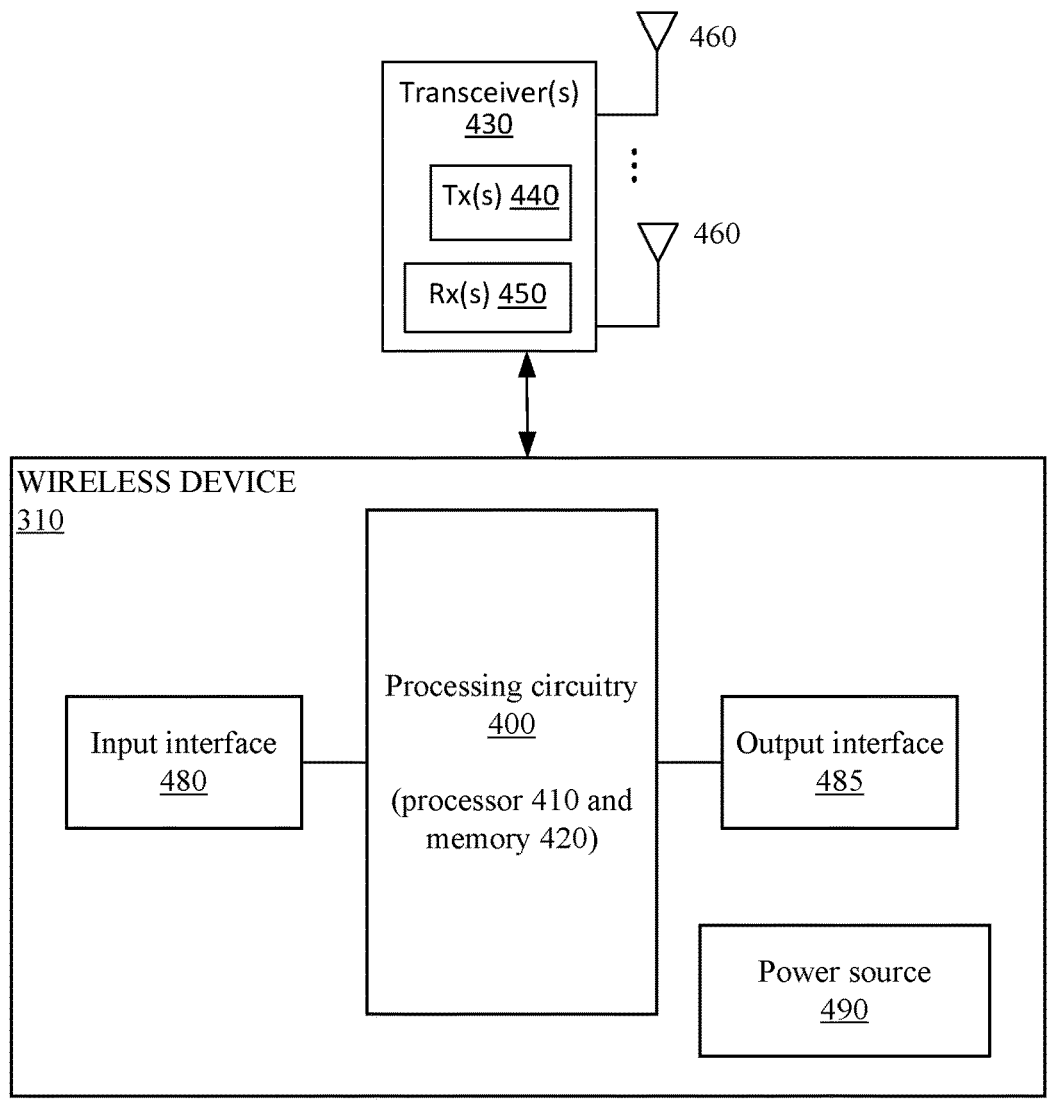
FIGS. 15 and 16 are block diagrams that illustrate a wireless device according to some embodiments of the present disclosure.

FIG. 15 is a schematic block diagram of the wireless device 310 according to some embodiments of the present disclosure. As illustrated, the wireless device 310 includes circuitry 400 comprising one or more processors 410 (e.g., Central Processing Units (CPUs), Application Specific Integrated Circuits (ASICs), Field Programmable Gate Arrays (FPGAs), and/or the like) and memory 420. The wireless device 310 also includes one or more transceivers 430 each including one or more transmitters 440 and one or more receivers 450 coupled to one or more antennas 460. Furthermore, the processing circuitry 400 may be connected to an input interface 480 and an output interface 485. The input interface 480 and the output interface 485 may be referred to as communication interfaces. The wireless device 310 may further comprise power source 490.

In some embodiments, the functionality of the wireless device 310 described above may be fully or partially implemented in software that is, e.g., stored in the memory 420 and executed by the processor(s) 410. For example, the processor 410 is configured to perform all the functionalities performed by the wireless device 310.

In some embodiments, a computer program including instructions which, when executed by the at least one processor 410, causes the at least one processor 410 to carry out the functionality of the wireless device 310 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 16:
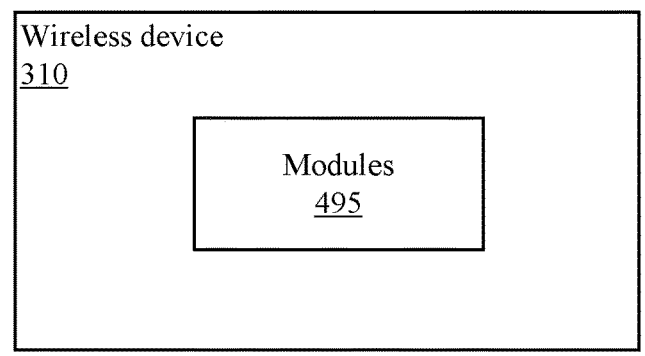

FIG. 16 is a schematic block diagram of the wireless device 310 according to some other embodiments of the present disclosure. The wireless device 310 includes one or more modules 495, each of which is implemented in software. The module(s) 495 provide the functionality of the wireless device 310 described herein.

Figure 17:
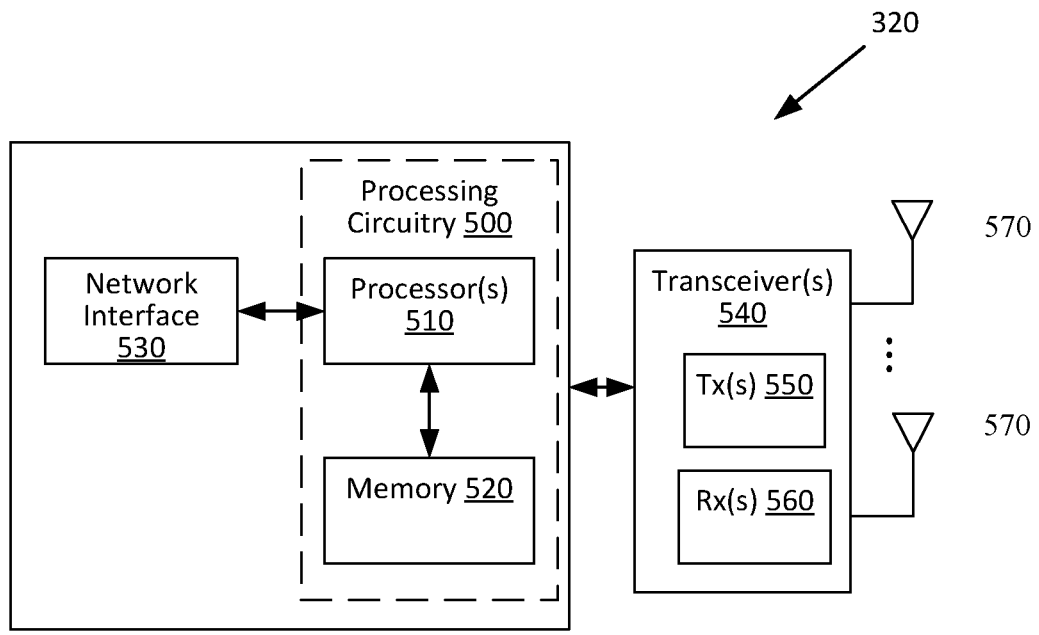
FIGS. 17 and 18 are block diagrams that illustrate a network node according to some embodiments of the present disclosure.

FIG. 17 is a schematic block diagram of a network node 320 according to some embodiments of the present disclosure. As illustrated, the network node 320 includes a processing circuitry 500 comprising one or more processors 510 (e.g., CPUs, ASICs, FPGAs, and/or the like) and memory 520. The network node also comprises a network interface 530. The network node 320 also includes one or more transceivers 540 that each include one or more transmitters 550 and one or more receivers 560 coupled to one or more antennas 570. In some embodiments, the functionality of the network node 320 described above may be fully or partially implemented in software that is, e.g., stored in the memory 520 and executed by the processor(s) 510. For example, the processor 510 can be configured to perform any steps of the methods 200, 230 and 260 of FIGS. 11 to 13 respectively, when the network node 320 is a source IAB node, a target IAB node and a MT of a migrating IAB node respectively.

Figure 18:
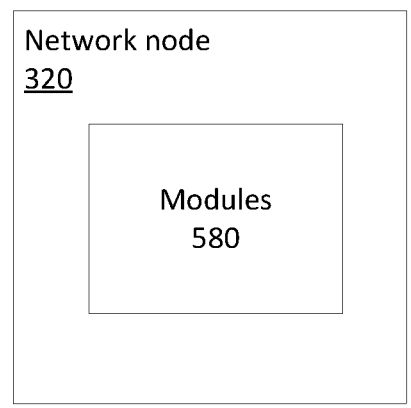

FIG. 18 is a schematic block diagram of the network node 320 according to some other embodiments of the present disclosure. The network node 320 includes one or more modules 580, each of which is implemented in software. The module(s) 580 provide the functionality of the network node 320 described herein. The module(s) 580 may comprise, for example, a sending module operable to perform step 210 of FIG. 11, step 250 of FIG. 12 and step 270 of FIG. 13. The modules 580 may comprise a receiving module operable to perform step 220 of FIG. 11, step 240 of FIG. 12, and step 280 of FIG. 13. The modules 580 may comprise establishing module operable to perform step 290 of FIG. 13.

Figure 19:
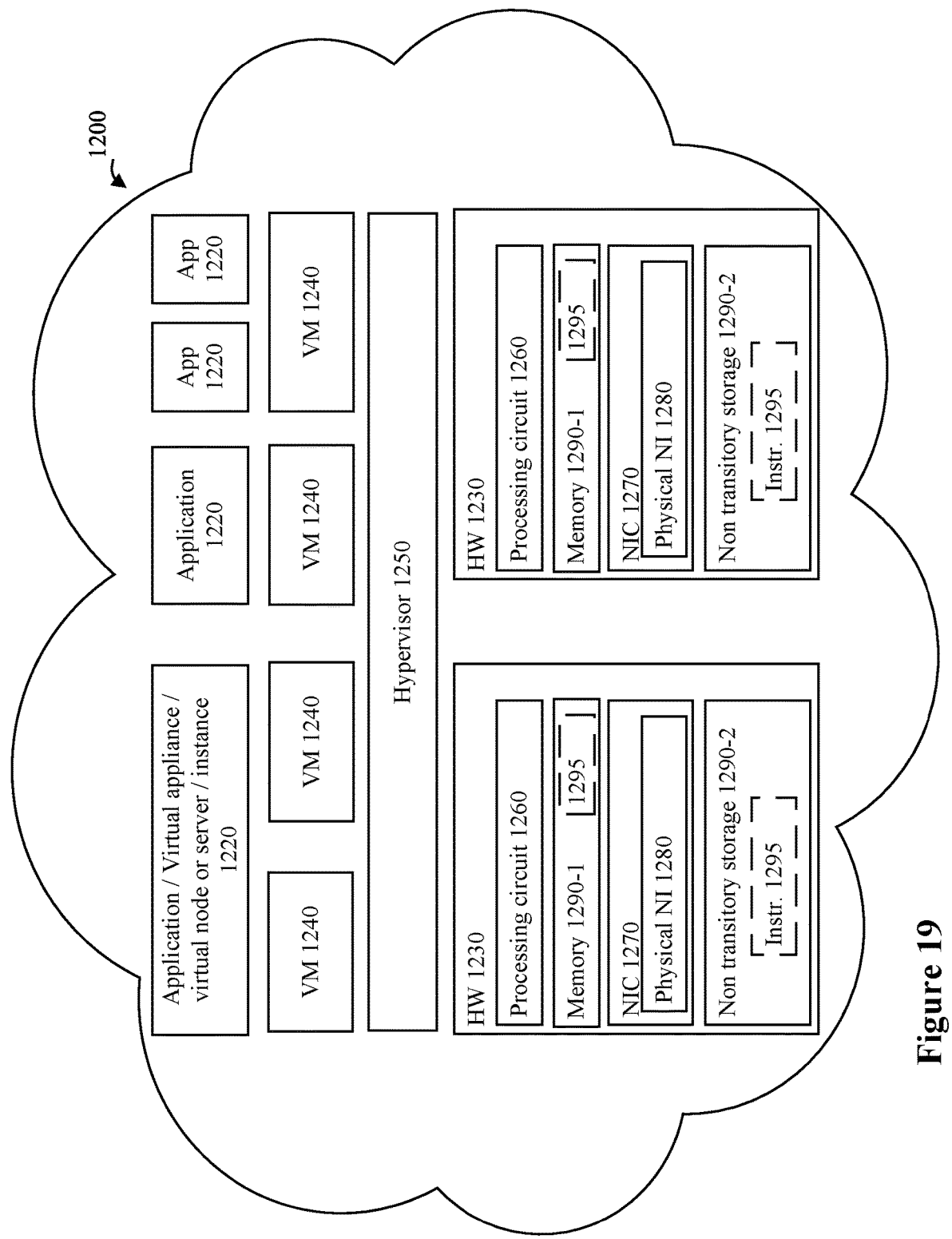
FIG. 19 illustrates a virtualized environment of a network node, according to some embodiments of the present disclosure.

FIG. 19 is a schematic block diagram that illustrates a virtualized embodiment of the wireless device 310 or network node 320, according to some embodiments of the present disclosure. As used herein, a "virtualized" node 1200 is a network node 320 or wireless device 310 in which at least a portion of the functionality of the network node 320 or wireless device 310 is implemented as a virtual component (e.g., via a virtual machine(s) executing on a physical processing node(s) in a network(s)). For example, in FIG. 16, there is provided an instance or a virtual appliance 1220 implementing the methods or parts of the methods of some embodiments. The one or more instance(s) runs in a cloud computing environment 1200. The cloud computing environment provides processing circuits 1230 and memory 1290-1 for the one or more instance(s) or virtual applications 1220. The memory 1290-1 contains instructions 1295 executable by the processing circuit 1260 whereby the instance 1220 is operative to execute the methods or part of the methods described herein in relation to some embodiments.

The cloud computing environment 1200 comprises one or more general-purpose network devices including hardware 1230 comprising a set of one or more processor(s) or processing circuits 1260, which may be commercial off-the-shelf (COTS) processors, dedicated Application Specific Integrated Circuits (ASICs), or any other type of processing circuit including digital or analog hardware components or special purpose processors, and network interface controller(s) (NICs) 1270, also known as network interface cards, which include physical Network Interface 1280. The general-purpose network device also includes non-transitory machine readable storage media 1290-2 having stored therein software and/or instructions 1295 executable by the processor 1260. During operation, the processor(s)/processing circuits 1260 execute the software/instructions 1295 to instantiate a hypervisor 1250, sometimes referred to as a virtual machine monitor (VMM), and one or more virtual machines 1240 that are run by the hypervisor 1250.

A virtual machine 1240 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1240, and that part of the hardware 1230 that executes that virtual machine 1240, be it hardware 1230 dedicated to that virtual machine 1240 and/or time slices of hardware 1230 temporally shared by that virtual machine 1240 with others of the virtual machine(s) 1240, forms a separate virtual network element(s) (VNE).

The hypervisor 1250 may present a virtual operating platform that appears like networking hardware to virtual machine 1240, and the virtual machine 1240 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1220 may be implemented on one or more of the virtual machine(s) 1240, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Exemplary Embodiments

Some exemplary embodiments include:

1. A method in a source Integrated Access Backhaul (IAB) node to which a Mobile Termination (MT) of an IAB node is connected before a handover, the method comprising:
sending a handover request to a target IAB node for migrating the MT to, wherein the handover request comprises an indication of a proxied inter donor IAB node migration; and
receiving a handover response.

2. The method of embodiment 2, wherein the handover response comprises a full handover or a proxy handover.

3. The method of embodiment 1 or 2, wherein the handover request further comprises information about a list of backhaul (BH) Radio Link Control (RLC) channels over a BH link between the IAB node and a parent IAB node of the IAB node.

4. The method of embodiment 3, wherein, for each BH RLC channel, the information further comprises one or more of the following: a BH RLC channel identity (ID), a Logical Chanel ID (LCID), a Quality of Service (QoS) profile for a User Plane BH RLC channel, a priority for a Control Plane BH RLC Channel, a RLC mode, a radio bearer mapping scheme over the BH RLC channel, a mapping between DSCP and/or IP flow label and/or IP address for each BAP routing ID carried over this BH RLC channel, a BAP address of the IAB node, BAP addresses of the children nodes (directly and indirectly served) by the IAB node.

5. The method of embodiment 4, wherein the radio bearer mapping scheme comprises a 1 to 1 (1:1) mapping or a N to 1 (N:1) mapping.

6. The method of embodiment 5, wherein the information comprises a number of UE bearers mapped to BH RLC Channel in case of the N:1 mapping scheme.

7. The method of any one of embodiments 1 to 6, wherein sending the handover request comprising using a XnAP handover preparation message.

8. The method of any one of embodiments 1 to 6, wherein sending the handover request comprising using a new XnAP message.

9. The method of any one of embodiments 1 to 8, wherein the source IAB node is a source Centralized Unit (CU) of a donor IAB node.

10. The method of any one of embodiments 1 to 9, wherein the target IAB node is a target Centralized Unit (CU) of a donor IAB node.

11. A method in a target Integrated Access Backhaul (IAB) node to which a Mobile Termination (MT) of an IAB node intends to migrate from a source IAB node, the method comprising:
receiving a handover request from the source IAB node, the handover request comprising an indication of a proxied inter donor IAB node migration; and
sending a handover response to the source IAB node.

12. The method of embodiment 11, wherein the handover response comprises information to help the source IAB node to trigger the migration of the MT only, while keeping/maintaining a F1 interface with the rest of the IAB node (e.g. DU) along with UE contexts of all the UEs served by the IAB-node.

13. The method of embodiment 11 or 12, wherein the handover response is a HANDOVER REQUEST ACKNOWLEDGE message.

14. The method of embodiment 11 or 12, wherein the handover response is a new XnAP message.

15. The method of any one of embodiments 11 to 14, wherein the handover request comprises information about a list of BH RLC channels, wherein, for each BH RLC channel, the information further comprises one or more of the following: a BH RLC channel identity (ID), a Logical Chanel ID (LCID), a Quality of Service (QoS) profile for a User Plane BH RLC channel, a priority for a Control Plane BH RLC Channel, a RLC mode, a radio bearer mapping scheme over the BH RLC channel, a mapping between DSCP and/or IP flow label and/or IP address for each BAP routing ID carried over this BH RLC channel, a BAP address of the IAB node, BAP addresses of the children nodes (directly and indirectly served) by the IAB node.

16. The method of any one of embodiments 11 to 15, further comprising accepting the handover.

17. The method of embodiment 16, further comprising setting up a dedicated BH RLC channel on each BH link/hop until the IAB node that has migrated, if the mapping scheme is 1:1.

18. The method of embodiment 16, further comprising setting up a BH channel with a corresponding QoS profile or priority on the link between the parent node and the migrating IAB node, if the mapping scheme is N:1.

19. The method of any one of embodiments 16 to 18, further comprising updating a routing/mapping table at each intermediate IAB-node between the target IAB and a new parent node for all BAP paths traversing and/or terminated at the IAB-node.

20. The method of any one of embodiments 16 to 19, further comprising setting up F1 context.

21. The method of any one of embodiments 16 to 20, further comprising assigning BAP addresses of IAB nodes in paths traversing and/or terminated at the IAB-node.

22. The method of any one of embodiments 16 to 21, further comprising indicating to a distributed Unit (DU) of the target IAB node Internet Protocol (IP) addresses associated with traffic for the IAB node and direct/indirect children nodes of the IAB node.

23. The method of any one of embodiments 16 to 21, further comprising requesting a DU of the target IAB for new IP addresses for the IAB node and other nodes involved.

24. The method of embodiment 23, further comprising receiving the IP addresses.

25. The method of embodiment 24, further comprising sending the received IP addresses to the source IAB node.

26. The method of any one of embodiments 16 to 25, further comprising configuring the DU of the target IAB node with a mapping of DSCP and/or IP flow label and/or IP address to a BAP routing ID and a next-hop BH RLC channel mapping that was received in the HO request.

27. The method of any one of embodiments 11 to 26, wherein the source IAB node is a source Centralized Unit (CU) of a donor IAB node.

28. The method of any one of embodiments 11 to 27, wherein the target IAB node is a target Centralized Unit (CU) of a donor IAB node.

29. A method in a Mobile Termination (MT) of an Integrated Access Backhaul (IAB) node, the method comprising:
    sending a request message to a target IAB node for establishing a connection with the IAB node, the message comprising an indication of a proxied inter donor IAB node migration.
    receiving a response message; and
    establishing the connection with the target IAB node.

30. The method of embodiment 29, further comprising translating Backhaul Adaptation Protocol (BAP) addresses on both downlink (DL) and Uplink (UL) transmissions.

31. The method of embodiment 30, further comprising obtaining one or more of the following information: own BAP address/routing IDs, BAP addresses/Routing IDs of all nodes that the IAB node is serving directly or indirectly, BAP address/routing ID of a new parent node and BAP address/routing ID of the target IAB node.

32. The method of embodiment 31, wherein obtaining comprising receiving the one or more information from the target IAB node (e.g. Handover RRC message) or from the source IAB node (e.g. via F1 signalling).

33. The method of any one of embodiments 29 to 32, further comprising receiving an indication of inter donor IAB node migration or intra donor IAB node migration.

34. The method of any one of embodiments 29 to 33, further comprising receiving an indication of a full handover or a proxied handover.

35. The method of any one of embodiments 29 to 34, wherein the source IAB node is a source Centralized Unit (CU) of a donor IAB node.

36. The method of any one of embodiments 29 to 35, wherein the target IAB node is a target Centralized Unit (CU) of a donor IAB node.

37. A network node comprising a communication interface and processing circuitry connected thereto and configured to perform the method of any one of embodiments 1 to 36.

38. A computer program product comprising a non-transitory computer readable storage medium having computer readable program code embodied in the medium, the computer readable program code comprising computer readable program code to operate according to any of the methods of embodiments 1 to 36.

What is claimed is:

1. A method in a source Integrated Access Backhaul (IAB) node, the method comprising:
   sending a handover request from the source IAB node to a target IAB node to which a Mobile Termination (MT) of an IAB node is to be migrated, wherein the handover request comprises an indication of a proxied inter donor IAB node migration of the MT to the target IAB node, wherein, according to the indication of the proxied inter donor IAB node migration, a radio resource control (RRC) connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node; and
   receiving a handover response in response to the handover request.

2. The method of claim 1, wherein the handover request further comprises information about a list of backhaul (BH) Radio Link Control (RLC) channels over a BH link between the IAB node and a parent IAB node of the IAB node.

3. The method of claim 2, wherein the information about the list of BH RLC channels comprises, for each BH RLC channel in the list, one or more of:
   a BH RLC channel identity of the BH RLC channel;
   a Logical Chanel ID for the BH RLC channel;
   a Quality of Service profile, or a priority, for the BH RLC channel;
   a Radio Link Control mode for the BH RLC channel;
   a radio bearer mapping scheme over the BH RLC channel; and
   for each of one or more Backhaul Adaptation Protocol (BAP) routing identities carried over this BH RLC channel, a mapping that maps one or more values to the BAP routing identity, wherein the one or more values include one or more of a Differentiated Services Code Point, an Internet Protocol (IP) flow label, or an IP address.

4. The method of claim 3, wherein the information about the list of BH RLC channels comprises, for at least one BH RLC channel in the list where the radio bearer mapping scheme over the BH RLC channel is a N to 1 mapping, a number of user equipment bearers mapped to the BH RLC Channel.

5. The method of claim 1, wherein the handover request further comprises:
   information indicating a BAP address of the IAB node;
   one or more BAP addresses of one or more children nodes served by the IAB node; or
   the information indicating the BAP address of the IAB node and the one or more BAP addresses of the one or more children nodes served by the IAB node.

6. The method of claim 1, wherein the handover request comprises an XnAP handover preparation message.

7. The method of claim 1, wherein the source IAB node is a source Centralized Unit (CU) of a source donor IAB node and wherein the target IAB node is a target Centralized Unit (CU) of a target donor IAB node.

8. A method in a target Integrated Access Backhaul (IAB) node, the method comprising:
- receiving a handover request from a source IAB node, the handover request comprising an indication of a proxied inter donor IAB node migration of a Mobile Termination (MT) of an IAB node from the source IAB node to the target IAB node, wherein, according to the indication of the proxied inter donor IAB node migration, a radio resource control (RRC) connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node; and
- sending a handover response to the source IAB node.

9. The method of claim 8, wherein the handover request further comprises information about a list of backhaul (BH) Radio Link Control (RLC) channels over a BH link between the IAB node and a parent IAB node of the IAB node.

10. The method of claim 9, wherein the information about the list of BH RLC channels comprises, for each BH RLC channel in the list, one or more of:
- a BH RLC channel identity of the BH RLC channel;
- a Logical Chanel ID for the BH RLC channel;
- a Quality of Service profile, or a priority, for the BH RLC channel;
- a Radio Link Control mode for the BH RLC channel;
- a radio bearer mapping scheme over the BH RLC channel; and
- for each of one or more Backhaul Adaptation Protocol (BAP) routing identities carried over this BH RLC channel, a mapping that maps one or more values to the BAP routing identity, wherein the one or more values include one or more of a Differentiated Services Code Point, an Internet Protocol (IP) flow label, or an IP address.

11. The method of claim 10, wherein the information about the list of BH RLC channels comprises, for at least one BH RLC channel in the list where the radio bearer mapping scheme over the BH RLC channel is a N to 1 mapping, a number of user equipment bearers mapped to the BH RLC Channel.

12. The method of claim 9, further comprising, for each BH RLC channel in the list, configuring a corresponding BH RLC channel on each of one or more BH hops between the target IAB node and the IAB node.

13. The method of claim 9, further comprising, for each BH RLC channel in the list:
- if the handover request indicates that a radio bearer mapping scheme for the BH RLC channel is a 1:1 scheme, setting up a corresponding BH RLC channel on each of one or more BH hops between the target IAB node and the IAB node; and
- if the handover request indicates that a radio bearer mapping scheme for the BH RLC channel is a N:1 scheme, setting up a BH RLC channel with a corresponding Quality of Service profile or priority on a BH hop between the parent node and the IAB node and, for each of one or more BH hops between the target IAB node and the parent node, setting up a BH RLC channel with a corresponding Quality of Service profile or priority on the BH hop if one is not already available for use.

14. The method of claim 8, wherein the handover request further comprises information indicating a BAP address of the IAB node and/or BAP addresses of one or more children nodes served by the IAB node.

15. The method of claim 8, further comprising assigning BAP addresses of IAB nodes in paths traversing and/or terminated at the IAB node.

16. The method of claim 8, wherein the handover request comprises an XnAP handover preparation message.

17. The method of claim 8, wherein the source IAB node is a source Centralized Unit (CU) of a source donor IAB node and wherein the target IAB node is a target Centralized Unit (CU) of a target donor IAB node.

18. The method of claim 8, wherein the handover response comprises information to help the source IAB node to trigger the migration of the MT only to the target IAB node, while keeping an F1 interface with a Distributed Unit of the IAB node along with user equipment (UE) contexts of UEs served by the IAB node.

19. A source Integrated Access Backhaul (IAB) node, comprising:
- communication circuitry; and
- processing circuitry configured to:
  - send a handover request from the source IAB node to a target IAB node to which a Mobile Termination (MT) of an IAB node is to be migrated, wherein the handover request comprises an indication of a proxied inter donor IAB node migration of the MT to the target IAB node, wherein, according to the indication of the proxied inter donor IAB node migration, a radio resource control (RRC) connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node; and
  - receive a handover response in response to the handover request.

20. The source IAB node of claim 19, wherein the handover request further comprises information about a list of backhaul (BH) Radio Link Control (RLC) channels over a BH link between the IAB node and a parent IAB node of the IAB node.

21. The source IAB node of claim 20, wherein the information about the list of BH RLC channels comprises, for each BH RLC channel in the list, one or more of:
- a BH RLC channel identity of the BH RLC channel;
- a Logical Chanel ID for the BH RLC channel;
- a Quality of Service profile, or a priority, for the BH RLC channel;
- a Radio Link Control mode for the BH RLC channel;
- a radio bearer mapping scheme over the BH RLC channel; and
- for each of one or more Backhaul Adaptation Protocol (BAP) routing identities carried over this BH RLC channel, a mapping that maps one or more values to the BAP routing identity, wherein the one or more values include one or more of a Differentiated Services Code Point, an Internet Protocol (IP) flow label, or an IP address.

22. A target Integrated Access Backhaul (IAB) node comprising:
 communication circuitry; and
 processing circuitry configured to:
  receive a handover request from a source IAB node, the handover request comprising an indication of a proxied inter donor IAB node migration of a Mobile Termination (MT) of an IAB node from the source IAB node to the target IAB node, wherein, according to the indication of the proxied inter donor IAB node migration, a radio resource control (RRC) connection of the IAB node is to be migrated to the target IAB node but F1 connections and RRC connections of any children nodes served by the IAB node are to be kept at the source IAB node such that the target IAB node is to serve as a proxy for the F1 connections and RRC connections kept at the source IAB node; and
  send a handover response to the source IAB node.

23. The target IAB node of claim 22, wherein the handover request further comprises information about a list of backhaul (BH) Radio Link Control (RLC) channels over a BH link between the IAB node and a parent IAB node of the IAB node.

24. The source IAB node of claim 19, wherein the source IAB node is a source Centralized Unit (CU) of a source donor IAB node and wherein the target IAB node is a target Centralized Unit (CU) of a target donor IAB node.

25. The target IAB node of claim 22, wherein the source IAB node is a source Centralized Unit (CU) of a source donor IAB node and wherein the target IAB node is a target Centralized Unit (CU) of a target donor IAB node.

26. The method of claim 1, wherein the IAB node serves one or more children nodes, and wherein according to the indication of the proxied inter donor IAB node migration, the RRC connection of the IAB node is to be migrated to the target IAB node but F1 connections and RRC connections of the one or more children nodes served by the IAB node are to be kept at the source IAB node such that the target IAB node is to serve as a proxy for the F1 connections and RRC connections kept at the source IAB node.

* * * * *